United States Patent [19]
Kashiwagi et al.

[11] Patent Number: 5,938,891
[45] Date of Patent: Aug. 17, 1999

[54] DISK BONDING SYSTEM

[75] Inventors: Toshio Kashiwagi; Katumi Yamaguchi; Masahiko Kotoyori, all of Tokyo; Hironobu Nishimura, Saitama, all of Japan

[73] Assignee: Origin Electric Company, Limited, Tokyo, Japan

[21] Appl. No.: 08/801,415

[22] Filed: Feb. 21, 1997

[30] Foreign Application Priority Data

| Feb. 27, 1996 | [JP] | Japan | 8-065357 |
| May 24, 1996 | [JP] | Japan | 8-153460 |
| Jun. 25, 1996 | [JP] | Japan | 8-184184 |

[51] Int. Cl.$^6$ .................................................. B32B 31/00
[52] U.S. Cl. ...................... 156/578; 156/295; 369/286; 427/240
[58] Field of Search ................... 156/578, 275.3, 156/275.7, 291, 295; 427/231, 240; 428/65.2; 369/286

[56] References Cited

U.S. PATENT DOCUMENTS

| 4,877,475 | 10/1989 | Uchida et al. .............. 156/275.7 X |
| 4,983,335 | 1/1991 | Matsuo et al. . | |
| 4,990,208 | 2/1991 | Kano .............................. 156/295 X |
| 5,000,651 | 3/1991 | Akagawa et al. . | |
| 5,232,505 | 8/1993 | Novak et al. . | |
| 5,318,653 | 6/1994 | Toide et al. ................. 156/295 |

FOREIGN PATENT DOCUMENTS

| 0229914 | 7/1987 | European Pat. Off. . |
| 0245953 | 11/1987 | European Pat. Off. . |
| 0398799 | 11/1990 | European Pat. Off. . |
| 0443797 | 8/1991 | European Pat. Off. . |
| 0624870 | 11/1994 | European Pat. Off. . |
| 3540623 | 5/1987 | Germany . |
| 4041199 | 7/1992 | Germany . |
| 63-27577 | 2/1988 | Japan . |
| 4-38731 | 2/1992 | Japan . |
| 4-53012 | 8/1992 | Japan . |
| 6-142594 | 5/1994 | Japan . |

*Primary Examiner*—James Engel
*Attorney, Agent, or Firm*—McDermott, Will & Emery

[57] ABSTRACT

A system for fabricating a bonded disk, comprises an adhesive supplying section for supplying a liquid adhesive on a first disk, a disk handling section for mating the first disk with a second disk, a spin coating section for spreading the adhesive between the first and second disks and a curing section for curing the adhesive. The disk handling section comprises a disk transfer mechanism for arranging the first and second disks in a confronting state in which the first and second disks confront each other and the adhesive supplied to the first disk is interposed between the first and second disks, and for transferring the first and second disks to the spin coating section so that the first and second disks remain in the confronting state.

48 Claims, 14 Drawing Sheets

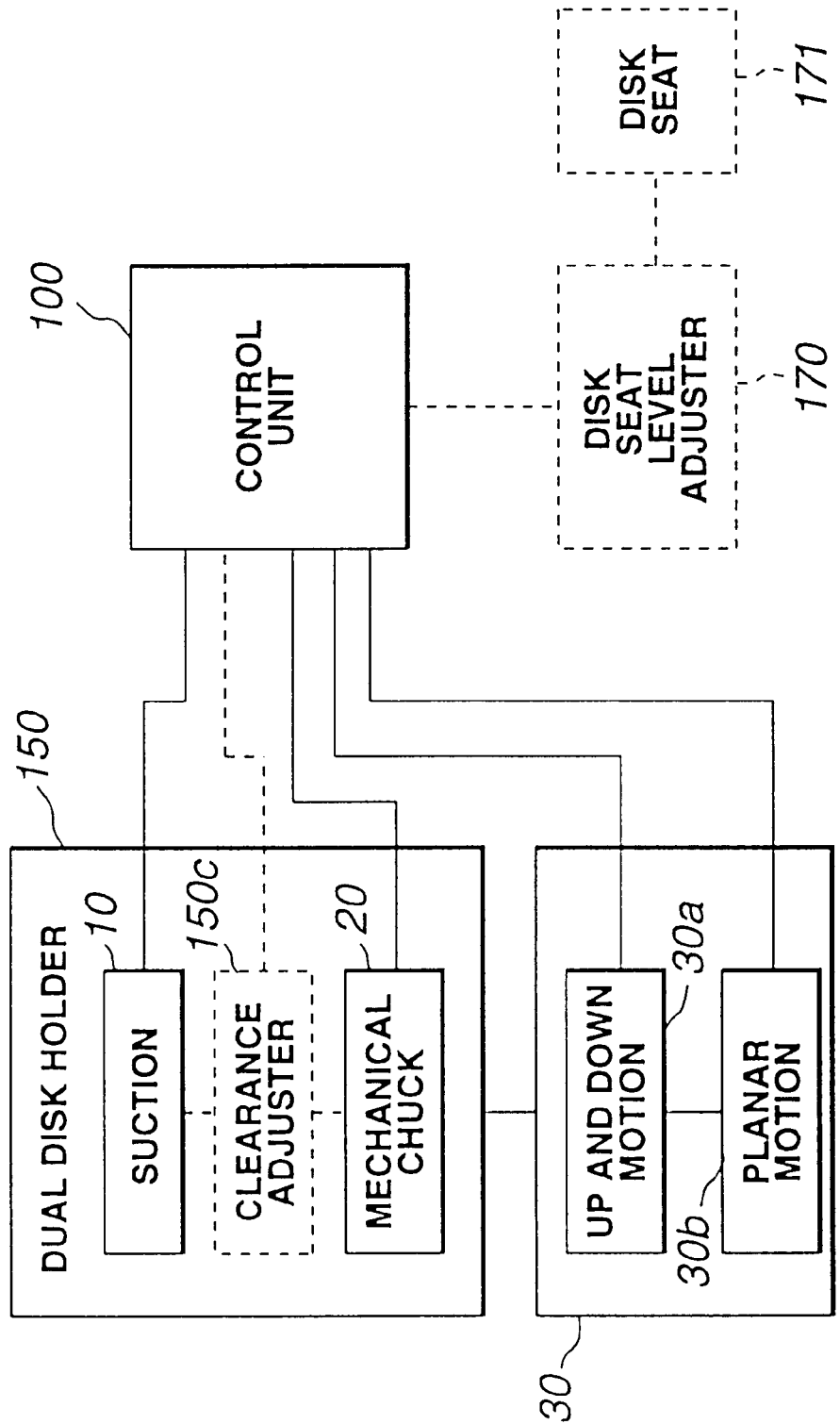

$0 < h3 - h4 < d$

DISK BONDING SYSTEM

BACKGROUND OF THE INVENTION

The present invention relates to a disk bonding or fabricating system for forming a single disk by bonding first and second disks.

A disk bonding process of one conventional example includes a first operation of placing a lower side disk on a spin coater, a second operation of supplying an adhesive to the lower side disk on the spin coater while the spin coater is spinning at a low speed, a third operation for stopping the spin of the spin coater and overlapping an upper side disk on the lower side disk, a fourth operation of spreading the adhesive between the lower and upper disks by spinning the lower and upper disks on the spin coater at a high speed for a predetermined time duration, a fifth operation for stopping the spin of the spin coater again and transferring the upper and lower disks bonded by the adhesive, to an ultraviolet irradiating unit, and a sixth operation of curing the adhesive layer between the lower and upper disks to complete the bonded disk. The spin coater can form an adhesive layer of a uniform thickness, and improve the flatness and uniformity of the bonded disk.

In this conventional process, the high speed spinning operation of the spin coater is interrupted from the operation of placing the lower disk on the spin coater to the end of the operation of overlapping the upper disk. Therefore, the conventional process prolongs the off time during which the high speed spin coating operation is not carried out, and accordingly deteriorates the duty cycle of the spin coater and the overall efficiency of the system.

When the upper disk is closely overlapped on the lower disk, an adhesive of a low viscosity spreads radially inwards as well as outwards, and tends to flow out from the center hole of the disk. When, on the other hand, an adhesive having a high viscosity requires a long time to spread over a required area.

In the curing step, furthermore, the bonded disk tends to be deformed, warped or corrugated because of heat generated by ultraviolet radiation and shrinkage of the adhesive layer in the setting of the adhesive.

SUMMARY OF THE INVENTION

It is therefore an object of the present invention to provide system and process that can improve the efficiency of the system by utilizing a spin coating section efficiently.

It is another object of the present invention to provide system and process that can be adapted to changes in viscosity of adhesive.

It is still another object of the present invention to provide system and process that can prevent or reduce deformation of the bonded disk According to the present invention, a disk fabricating system or process for forming a single disk by bonding first and second disks, comprises:

an adhesive supplying section or step for supplying a liquid adhesive to the first disk;

a disk handling section or step for arranging the first and second disks in a confronting state in which the first and second disks confront each other and the adhesive supplied to the first disk is interposed between the first and second disks, and for transferring the first and second disks so that the first and second disks remain in the confronting state; and a coating section or step for receiving the first and second disks from the disk handling section, and spreading the liquid adhesive between the first and second disks by a centrifugal force.

Preferably, the system or process further comprises a curing section or step for curing the adhesive spread between the first and second disks by the coating section or step.

The disk handling section may comprise a disk handling mechanism comprising: a second disk gripping means of a sucking type for gripping the second disk; and a first disk gripping means of a mechanical chucking type for gripping the first disk.

According to another aspect of the present invention, a system for bonding first and second disks to form a bonded disk, comprises a curing section which comprises:

a turntable;

a bonded disk supplying subsection for receiving a bonded disk formed by bonding the first and second disks by the adhesive and for placing the bonded disk on said turntable; and an ultraviolet irradiating subsection for irradiating ultraviolet rays to the bonded disk to cure an adhesive layer between the first and second disks of the bonded disk;

wherein said curing section further comprises a confining means for restricting a deformation of the bonded disk during ultraviolet irradiation by said ultraviolet irradiating subsection, said confining means comprises a quartz base for underlying the bonded disk, and a quartz cover for overlying the bonded disk, the quartz base comprises an upward facing underlying flat surface for underlying the bonded disk, and the quartz cover comprises a downward facing overlying flat surface for overlying the bonded disk;

wherein said confining means further comprises a spacing means for spacing the underlying surface of the quartz base and the overlying surface of the quartz cover from each other; and wherein said bonded disk supplying subsection comprises a transfer mechanism for placing the bonded disk on the quartz base on said turntable, said curing section further comprises a weight putting subsection for putting the quartz cover on the bonded disk resting on said quartz base, and said ultraviolet irradiating subsection comprises an ultraviolet irradiating device for irradiating the ultraviolet rays to the bonded disk interposed between the quartz base and cover.

Preferably, the underlying and overlying flat surfaces are finished like a mirror surface, so that they tend to adhere to each other. The spacing means facilitates removal of the quartz cover from the quartz base.

BRIEF DESCRIPTION OF DRAWINGS

FIG. 2B is a block diagram showing an arrangement of components of the disk transfer mechanism R1.

DETAILED DESCRIPTION OF THE INVENTION

Figure 1:
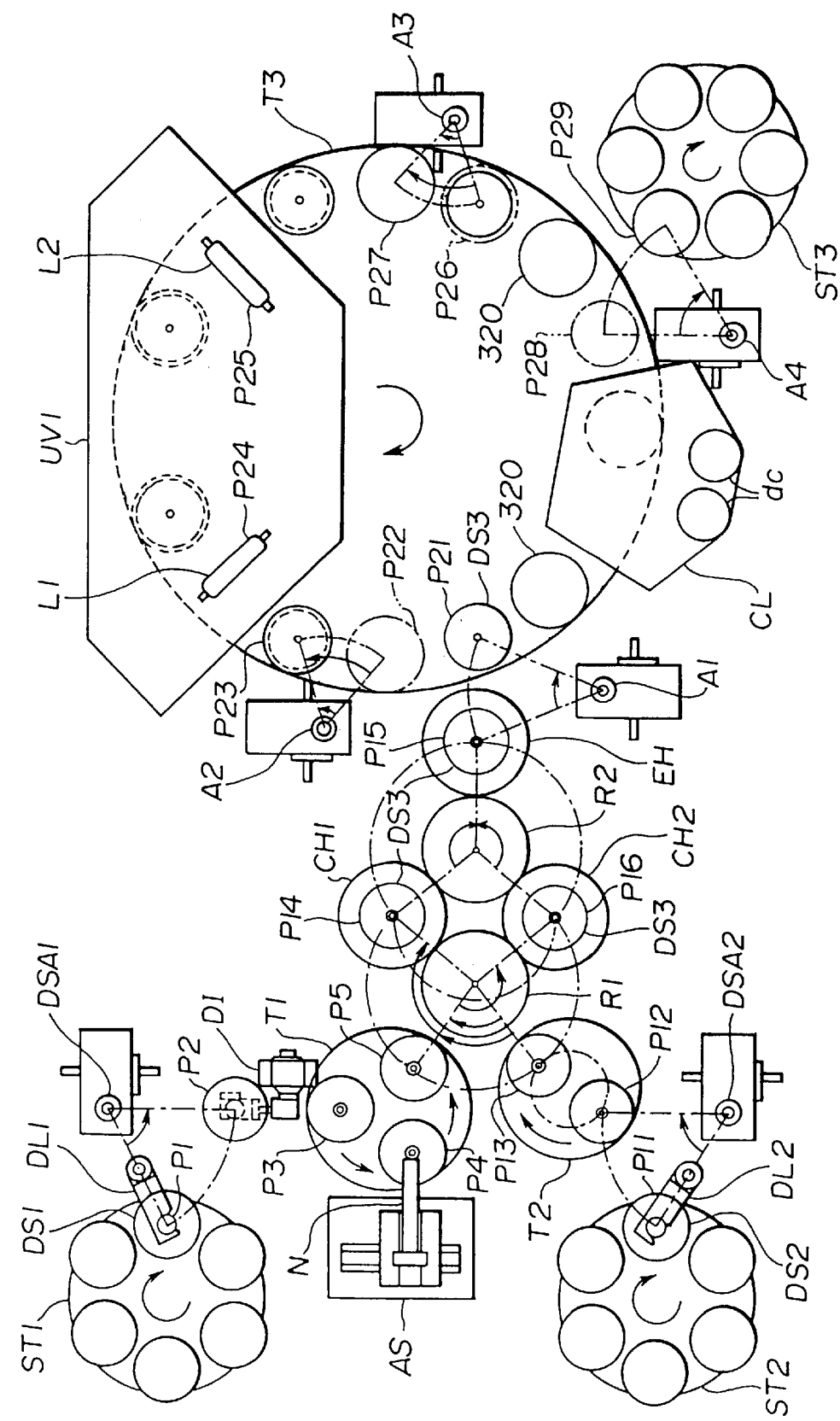
FIG. 1 is a plan view showing a disk bonding system according to an embodiment of the present invention.

FIG. 1 shows a disk fabricating system 10 according to an embodiment of the present invention.

This system 10 has first and second input sections (ST1, ST2) and one output section (ST3). First disks (DS1) flow from the first input section to the output section, and second disks (DS2) flow from the second input section to the output section. Between the input sections and the output section, there are further provided an adhesive supplying section (AS, N) for supplying a liquid adhesive on each first disk, a disk handling section (R1, T1, T2) for pairing first and second disks, a coating section (CH1, CH2, R2, EH) for forming a bonded disk (DS3) by bonding the first and second disks of each pair together, and a curing section (UV1, T3, A1, A2, A3, A4, CL) for curing the adhesive between the first and second disks of each bonded disk. Each bonded disk DS3 includes a lower layer formed by a first disk DS1, an upper layer formed by a second disk DS2, and an adhesive layer between the lower and upper layers.

The first input section of this example comprises a first stacker ST1 for storing first (lower side) disks DS1, and a combination of a disk supply arm DSA1 and a disk inverting unit DI, for supplying first disks DS1 one after another from the first stacker ST1 to a first turntable T1.

The adhesive supplying section of this example comprises an adhesive supplying unit AS for supplying the liquid adhesive on each first disk DS1 on the first turntable T1.

The second input section comprises a second disk stacker ST2 for storing second (upper side) disks DS2, and a second disk supplying arm DSA2 for supplying second disks DS2 one after another to a second turntable T2.

The disk handling section of this example comprises a disk transfer mechanism (or robot) R1 for pairing first and second disks by taking up one second disk DS2 from the second turntable T2 and one first disk DS1 from the first turntable T1, holding the first and second disks of each pair in a confronting state, and transferring the confronting disk pair to the coating section. In the confronting paired state, the second disk DS2 is located right above the first disk DS1 and both disks confront each other. The robot R1 transfers each disk pair to the coating section so that the lower and upper disks DS1 and DS2 of the pair remain in the confronting state. The thus constructed disk handling section can reduce the stoppage time of a spin coating operation of the coating section, and improve the speed and efficiency of the entire system.

The coating section of this example comprises first and second coater houses CH1 and CH2. In each coater house CH1 or CH2, the adhesive is spread by a centrifugal force between lower and upper disks in a pair, and each disk pair is formed into a bonded disk DS3 consisting of the lower and upper disks DS1 and DS2 glued together by a liquid adhesive layer sandwiched between the lower and upper disks DS1 and DS2.

Bonded disks DS3 are transferred sequentially to an edge trimming house EH for trimming disk edge, and further transferred to a third turntable T3 for the next curing operation.

The third turntable T3 of this example has eight quartz bases (not shown in FIG. 1) (310, 311) which are fixedly mounted on the turntable T3. The eight quartz bases are arranged at regular intervals in a circle. Each bonded disk DS3 is placed on one of the quartz bases and covered with a quartz cover (or lid) (320, 321).

The curing section of this example comprises, as a main component, an ultraviolet irradiating unit UV1 for curing the adhesive. Each bonded disk DS3 interposed between the underlying quartz base and the overlying quartz cover passes through the ultraviolet irradiating unit UV1. Thereafter, the quartz plate is removed, and each bonded disk DS3 is stacked on an output disk stacker ST3 of the output section.

Each section of the disk bonding system 10 shown in FIG. 1 is constructed and operated as follows:

A large number of lower side circular disks DS1 are piled in stacks on the first input stacker ST1. A first disk lifter DL1 holds a disk stack at a position P1 so that an uppermost disk DS1 of the stack is at a predetermined level. The disk supply arm DSA1 takes hold of the uppermost disk DS1 at the predetermined level at the position P1, and transfers that disk DS1 to a position P2.

The disk inverting unit DI takes up the disk DS1 from the position P2, turns the disk DS1 upside down, and places the disk DS1 on the first turntable T1 at a position P3. In this example, disks DS1 are stacked so that a recording surface of each disk faces downward in order to protect the recording surface from dust. The inverting unit DI inverts disks DS1 and places each disk with the recording surface facing upward, on the turntable T1.

In some disk fabricating systems, it is convenient to store the disks with the recording surfaces facing upward. In this case, it is possible to place the disk inverting unit DI between a position P11 and a position P12 shown in FIG. 1.

The turntable T1 rotates the disk DS1 through 120 degrees in a counterclockwise direction from the position P3 to an adhesive supplying position P4. At the position P4, a nozzle N of the adhesive supplying unit AS supplies a predetermined amount of the liquid adhesive onto the disk DS1. The adhesive is applied near the center of the disk DS1, and formed in a ring shape.

In this example, the nozzle N is supported by a nozzle support member which can slide along X and Y directions independently, and the nozzle support member moves the tip of the nozzle so as to describe a circle. During this circular motion, the adhesive in liquid state is discharged from the tip of the nozzle N, so that a ring-shaped adhesive layer is formed on the disk DS1 at the position P4. The ring-shaped adhesive layer is relatively small in diameter and approximately concentric with the disk DS1. The adhesive supplying unit AS of this example is arranged to start the circular motion of the nozzle tip before the arrival of the disk DS1 at the position P4. Therefore, the adhesive supplying unit AS can start the operation of discharging the adhesive immediately after the arrival of the disk DS1 at the position P4, without waiting until the circular motion of the nozzle reaches a steady state of a constant speed. Thus, this system can eliminate or minimize the waiting time.

After the application of the liquid adhesive, the turntable T1 rotates the lower disk DS1 through 120° in the counterclockwise direction about the axis of the turntable T1 from the adhesive supplying position P4 to a standby position P5, and the disk DS1 is on standby at the position P5.

A large number of upper side circular disks DS2 are stored in stacks on the second disk stacker ST2 of the second input section. A second disk lifter DL2 holds a disk stack at a position P11 so that an uppermost disk DS2 of the stack is at a predetermined level. The disk supply arm DSA2 takes hold of the uppermost disk DS2 at the predetermined level at the position P11, and transfers that disk to a position P12 on the second turntable T2. Then, the turntable T2 rotates 180° and the disk DS2 is carried from the position P12 to a second disk standby position P13.

The transfer mechanism (or robot) R1 of the disk handling section grasps the disk DS2 at the second disk standby position P13, and transfers the disk DS2 from the position P13 to the first disk standby position P5 above the disk DS1 resting at the position P5. Then, the transfer mechanism R1 further grasps the lower side disk DS1 together with the upper side disk DS2, and holds the pair of the lower and upper disks DS1 and DS2 in the confronting pair state in which the lower disk DS1 below is at a predetermined clearance apart from the upper disk DS2. In this example, the upper and lower disks DS2 and DS1 in the confront pair state are held substantially horizontal and hence parallel to each other, and the axes of the circular upper and lower disks DS2 and DS1 are substantially vertical, and substantially coincident and collinear with each other. The clearance between the upper and lower disks DS2 and DS1 of the confronting pair is such a distance that the adhesive on the lower disk DS1 touches the upper disk DS2, or such a distance that the adhesive on the lower disk DS1 does not touch the upper disk DS2. The clearance is appropriately determined as mentioned later.

Thereafter, the transfer mechanism (or robot) R1 swivels in a clockwise direction and carries the confronting disk pair of disks DS1 and DS2 from the position P5 to a position P14 on a rotatable disk seat (40) in a spin coating unit (spin coater) of the first coater house CH1. The spin coating unit stops the spinning motion of the disk seat immediately before the confronting disk pair is placed on the disk seat, and then the transfer mechanism R1 places the confronting disk pair on the disk seat held stationary. The spin coating unit starts rotating the disk seat immediately when the confronting disk pair is placed on the disk seat at the position P14. Therefore, this system can significantly reduce the stoppage time during which the spin coating unit is not in a spinning state, and accordingly, this system can improve the efficiency of the spin coating unit and the overall efficiency of the disk bonding system.

The spin coating unit spins the disk pair of upper and lower disks DS2 and DS1 at a high speed. Therefore, the ring-shaped adhesive layer between the upper and lower disks DS2 and DS1 spreads radially outward by a centrifugal force. The coater house CH1 has a means for catching and collecting splashes of the adhesive. At the expiration of a predetermined time required for the liquid adhesive to spread sufficiently over the entirety between the upper and lower disks DS2 and DS1 by the centrifugal force, the spin coating unit stops the spin. By this time, the upper and lower disks DS2 and DS1 are joined together into a bonded disk DS3.

Thereafter, a second transfer mechanism (or robot) R2 carries the bonded disk DS3 from the position P14 to a position P15 in the edge trimming house EH. In the edge trimming house EH, irregular projections of the adhesive are removed from the edge of the bonded disk DS3 by wiping or scraping. Then, a first transfer arm A1 transfers the bonded disk DS3 from the position P15 to a position P21 on the turntable T3.

While the spin coating unit in the coater house CH1 is spinning off an unwanted amount of the adhesive from the bonded disk DS3, the transfer mechanism R1 swivels back to the position P13, takes hold of a newly supplied disk DS2 at the position P13, transfers the new disk DS2 from the position P13 to the position P5 above a newly supplied lower disk DS1. At the position P5, the newly supplied upper and lower disks DS2 and DS1 are arranged in a confronting pair with the intervening clearance as mentioned before. The robot R1 then swivels in a counter-clockwise direction and carries the confronting disk pair of disks DS1 and DS2 from the position P5 to a position P16 on a rotatable disk seat (40) in a second spin coating unit (spin coater) of the second coater house CH2. Like the spin coating unit in the first coater house CH1, the second spin coating unit stops the spin of the disk seat immediately before the confronting disk pair is placed on the disk seat, and then the transfer mechanism (or robot) R1 places the confronting disk pair on the disk seat while the disk seat is held stationary. The second spin coating unit starts spinning the disk seat immediately when the confronting disk pair is placed on the disk seat at the position P16. Therefore, this system can significantly reduce the stoppage time of the spin coating unit and accordingly, this system can improve the efficiency of the spin coater and the overall efficiency of the system.

The operation for spreading the liquid adhesive by the centrifugal force requires relatively long time. The system of this example prevents this operation from forming a bottleneck in the production process by employing two of the coater houses CH1 and CH2. When the spinning operation is stopped in the coater house CH2, then the transfer mechanism (or robot) R2 carries the bonded disk DS3 from the position P16 to the position P15 in the edge trimming house EH.

In this example, the positions P5, P13, P14 and P15 are arranged in a circle, and the swivel axis of the robot R1 is located at the center of the circle, as shown in FIG. 1. Similarly, the positions P14, P16 and P15 are arranged in a circle, and the swivel axis of the robot R2 is located at the center of the circle defined by the positions P14, P16 and P15. The position P15 and the swivel axes of the robots R1 and R2, in this example, are aligned in a straight line, and the positions P14 and P16 are symmetrical with respect to this straight line. Similarly, the positions P5 and P13, in this example, are symmetrical with respect to this straight line. This straight line represents a plane of mirror symmetry or an imaginary median plane of bilateral symmetry. The distance between the positions P14 and P16 is greater than the distance between the positions P5 and P13.

On the third turntable T3, the before-mentioned eight quartz bases 310 (311) are arranged at regular angular intervals of 45° in a circle around the vertical axis of the turntable T3. The quartz bases of this example are fixed to the turntable T3. The first transfer arm A1 (serving as a bonded disk supplying subsection) removes a bonded disk DS3 from the position P15 in the edge trimming house EH of the coating section, and sets the bonded disk DS3 on one of the quartz bases at a position P21. A second transfer arm A2 (serving as a weight putting subsection) places one of the quartz covers 320 (321) on the bonded disk DS3 at a position P23 on the turntable T3. The quartz covers 320 of this example are in the form of a circular plate, and slightly greater in diameter than the circular bonded disk DS3. The circular shape of the quartz covers 320 is advantageous in that the circular quartz plate can permit uniform passage of ultraviolet radiation with a minimum size.

The turntable T3 rotates intermittently on its own vertical axis. For example, the turntable T3 repeats a cycles of a rotating period of 4 seconds, and a resting period of 1 second. The turntable T3 travels an angular distance of 45° during the rotating period, and remains stationary during the resting period.

During the one second resting period of the turntable T3, the first transfer arm A1 sets a bonded disk DS3 at the position P21 on the turntable T3, and the other transfer arms A2, A3 and A4 perform respective transfer operations, as mentioned below. It is optional to change the time lengths of the rotating and resting periods and the angular displacement of 45° according to need. After a bonded disk DS3 set at the position P21 is shifted to a position P23 by a 45° angular displacement of the turntable T3, the second transfer arm A2 takes up one quartz cover 320 from a position P22 on the turntable T3 and places the quartz cover 320 on the bonded disk DS3 at the position 23. At the position P23, therefore, the bonded disk DS3 is sandwiched between the underlying quartz base 310 (shown in FIG. 7) and the overlying quartz cover 320.

By a next angular displacement of 45°, the bonded disk DS3 interposed between the quartz base 310 and cover 320 enters the ultraviolet irradiating unit UV1, and receives the ultraviolet radiation from above through the overlying quartz plate QU and from below through the underlying quartz base from a first ultraviolet lamp unit L1 at a position P24 and from a second ultraviolet lamp unit L2 at a position P25. The ultraviolet irradiating unit UV1 of this example has the first and second ultraviolet lamp units L1 and L2 each including the upper and lower ultraviolet lamps confronting each other across the path of the bonded disk interposed between the quartz base and cover. However, it is optional to employ only one ultraviolet lamp pair if the power of irradiation is not problematical.

The quartz base 310 and cover 320, and the lower and upper disks DS1 and DS2 of the bonded disk DS3 are all transparent, and permit passage of ultraviolet radiation. Therefore, the ultraviolet radiation reaches the liquid adhesive layer between the lower and upper disks DS1 and DS2 and cures the adhesive layer. The weight of the quartz cover 320 prevents deformation of the lower and upper disks DS1 and DS2 due to temperature increase by the ultraviolet irradiation, and deformation due to adhesive setting and shrinkage.

When the bonded disk DS3 reaches a position P26 after the irradiating operation, and the turntable T3 ceases the rotation, the third transfer arm A3 (serving as a weight removing subsection) removes the quartz cover 320 from the bonded disk DS3 and places the quartz cover 320 at a position P27 during the resting period. When the bonded disk DS3 reaches a position P28, the fourth transfer arm A4 (serving as a bonded disk unloading subsection) transfers the bonded disk DS3 from the position P28 to the third disk stacker ST3 of the output section.

After the bonded disk unloading operation at the position P28, the quartz base (310) and cover 320 pass a cooling chamber (or subsection) CL for cooling the base and cover, and blowing off dust from the surfaces (310F, 320F) of the base and cover. The cooling chamber CL has at least one blower duct for introducing a cooling air into the cooling chamber CL and at least one discharge dust dc for discharging the air from the chamber CL. The blower duct has at least one opening for directing the cooling air toward the quartz base and the quartz cover in the cooling chamber CL. The opening of the discharge duct is remote from the opening of the blower duct, and provided near the inner wall of the cooling chamber.

In this example, the eight quartz base and eight seat positions for the quartz covers 320 are arranged alternately in a circle on the table T3.

In this example, the vertical clearance between the first and second disks DS1 and DS2 of each pair in the confronting state is determined in accordance with the viscosity of the liquid adhesive.

When the viscosity of the adhesive is high, it takes a longer time to spread the adhesive over a predetermined area after the adhesive on the first disk DS1 is brought into contact with the second disk DS2. In this case, therefore, the transfer mechanism R1 holds the first and second disks in the confronting state with a relatively narrow clearance permitting the second disk DS2 to touch the adhesive on the first disk DS1. With this narrower clearance, the system can reduce the time of the spin coating operation. The adhesive layer is disturbed when the second disk DS2 is placed on the adhesive layer, and the high speed spinning operation in such a disturbed state tends to cause air bubbles to be caught in the adhesive layer. Therefore, it is desirable to spread the adhesive layer to some extent beforehand. To do this, the adhesive is generally supplied to an outer position outside an inner boundary region of the coating area. Therefore, it is not possible to start the high speed spinning operation until the adhesive spreads radially inwardly to the inner boundary region. From these points, the narrower clearance is advantageous in the case of a high viscosity.

When the viscosity of the adhesive is low, the transfer mechanism R1 is arranged to hold the first and second disks of each pair with a relatively wide clearance spacing the second disk from the adhesive layer on the first disk. The liquid adhesive of a low viscosity reaches a state allowing the start of the high speed spinning operation within about one second from the placement of the second disk on the adhesive on the first disk.

The quartz bases and covers of this example are made of quartz literally. However, it is possible to employ other material having a sufficient capability of permitting passage of ultraviolet radiation. When the cover (320, 321) is used as a weighting member, the material of the cover (320, 321) is required to be relatively heavy to provide a predetermined weight.

The disk fabricating system shown in FIG. 1 can be applicable to any of the ROM type DVD, write-once type DVD and writable DVD.

Figure 2A:
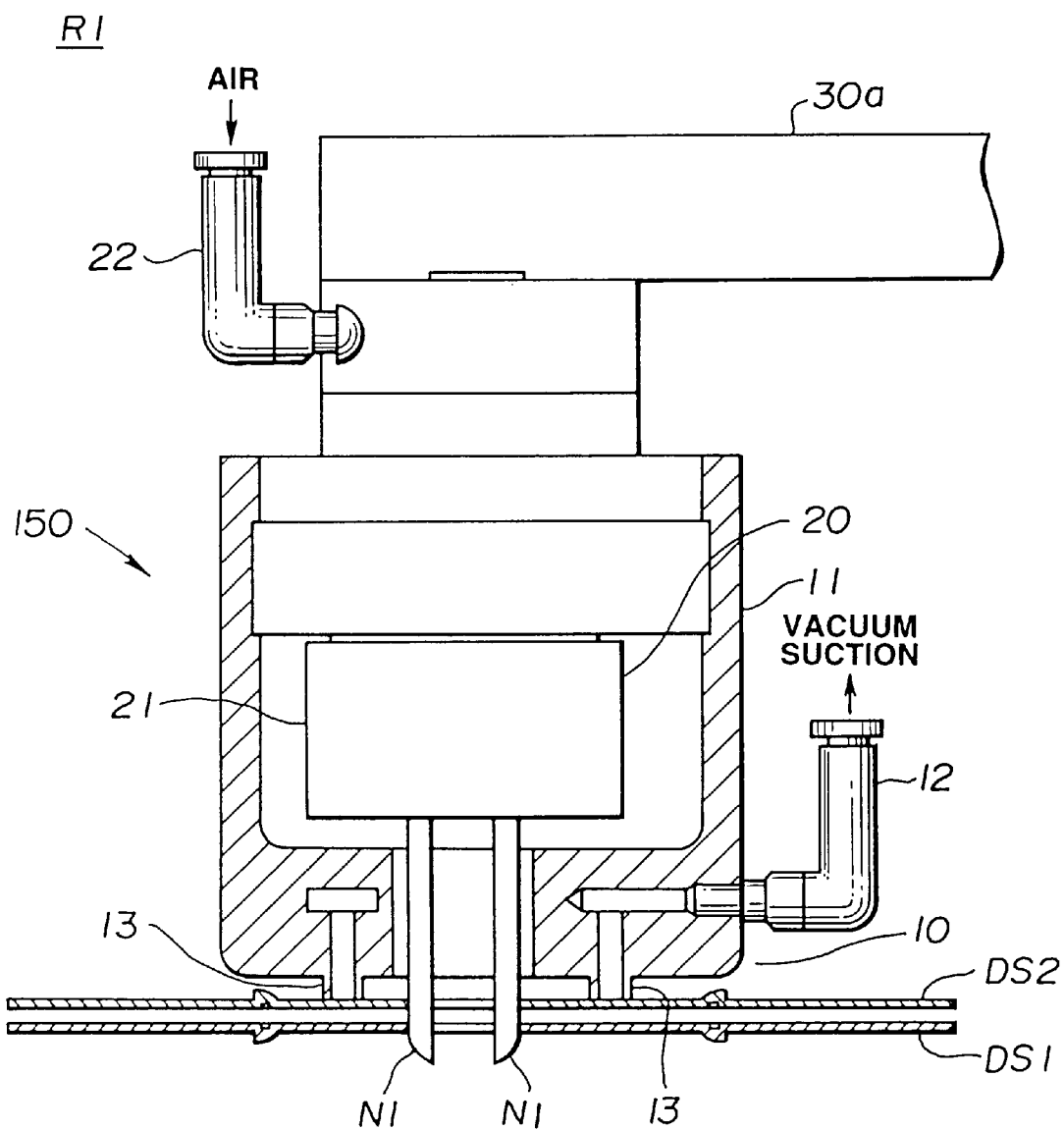
FIG. 2A is a front view showing, partly in section, a disk transfer mechanism R1 shown in FIG. 1.

FIGS. 2A and 2B show the first transfer mechanism (or robot) R1 of this example more in detail.

The first transfer mechanism (or robot) R1 shown in FIGS. 2A and 2B comprises a dual disk holder (or holding member) 150 comprising a second disk gripping (or sucking) device 10 for gripping a second disk DS2, and a first disk gripping (or chucking) device 20 for gripping a first disk DS1, a drive mechanism (or a disk moving means) 30 for moving the dual disk holder 150 of the second disk gripping device 10 and the first disk gripping device 20 as a unit, and a control unit (or a controlling means) 100 for controlling the second gripping device 10, the first gripping device 20 and the drive mechanism 30. The drive mechanism 30 of this example comprises a first drive section (or first moving means) 30a for an up and down motion of the disk holder 150 and a second drive section (or second moving means) 30b for a planar motion of the disk holder 150. For example, the second drive section 30b comprises a swingable robot arm capable of rotating the disk holder 150 in a circle passing through the positions P5, P13, P14 and P16.

The second disk gripping or sucking device 10 of the example shown in FIG. 2A comprises an outer case 11, and a sucking means which comprises a suction pipe 12, and a set of suction (or vacuum) pads 13 for sucking an upper side second disk DS2. The suction pads 13 are provided at the bottom of the outer case 11, and connected by vacuum passages with the suction pipe 12. The suction pad set of this example has one or two more suction pads in addition to the two suction pads 13 shown in FIG. 2A, and holds an upper side disk DS2 with these three or four suction pads 13.

The first disk gripping or chucking device of this example is a mechanical chucking device or means 20 comprising an inner case 21, and a set of claws N1 extending downward from the bottom of the inner case 21 through a hole in the bottom of the outer case 11. In this example, the inner case 21 is fixed in the outer case 11. The claws N1 are arranged to enter the center hole H1 of a lower side disk DS1, expand radially outward in the center hole H1, and thereby to chuck the thin cylindrical inner disk border (or edge) IE1 defining the circular center hole H1. Each of FIGS. 2A~5 shows only two of the claws N1 for the purpose of illustrating the expanding movement of the claws in the sectional view. In the actual example, however, the claw set consists of first, second and third claws N11, N12 and N13, as shown in FIG. 6A. The three claws N11, N12 and N13 are arranged in a circle at intervals of about 120° in a manner of radial symmetry. In the center hole H1 of a lower side disk DS1, the three claws N11, N12 and N13 expand radially so as to increase the diameter of a circle circumscribed about the claws until the diameter of the circumscribed circle enclosing the claws reaches the diameter of the center hole of the lower side disk DS1, and thereby grasp the lower side disk DS1. The radial distances of the claws from a vertical center axis of the mechanism chucking device 20 are held equal to one another during the expanding movement. It is optional to provide four or more of the claws instead of three.

The control unit 100 produces control signals to control the sucking device 10, the mechanical chucking device 20 and the drive mechanism 30. Under the control of the control unit 100, the sucking device 10 grasps an upper side disk DS2 at the second disk standby position P13, and the drive mechanism 30 transfers the upper side disk DS2 to the first disk standby position P5 above a lower side disk DS1 resting at the first disk standby position P5 by swinging the sucking device 10 holding the upper side disk DS2 together with the chucking device 20, and lowers the upper side disk DS2 at the standby position P5 by lowering the disk holder 150 of the sucking device 10 and the chucking device 20 until the lower end portions of the claws N1 of the chucking device 20 enter the center hole of the lower side disk DS1 and the vertical distance of the upper side disk DS2 from the lower side disk DS1 becomes equal to a predetermined value defining the predetermined vertical clearance. Then, the control unit 100 causes the chucking device 20 to expand its claws N1 and to chuck the lower side disk DS1 with the claws. Thus, the control unit 100 controls the spacing between the upper and lower disks DS2 and DS1 and causes the sucking device 10 and the chucking device 20 to hold the upper and lower disks DS2 and DS1 in the predetermined confronting state.

The control unit 100 of this example can perform a centering operation for centering a second disk DS2 before the sucking operation of the sucking device 10 at the position P13. In this case, the control unit 100 causes the claws N1 to come into the center hole of a second disk DS2 and to expand in the center hole of the disk DS2 for centering the disk DS2. After this centering operation, the sucking device 10 sucks the disk DS2 under the command of the control unit 100.

FIGS. 4A~4F show operations of the transfer mechanism R1 in the example shown in FIGS. 2A and 2B.

Figure 4A:
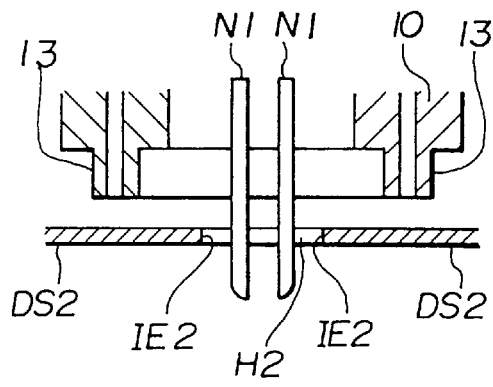
FIGS. 4A–4F are views for illustrating operations of the disk transfer mechanism R1.
Figure 4D:
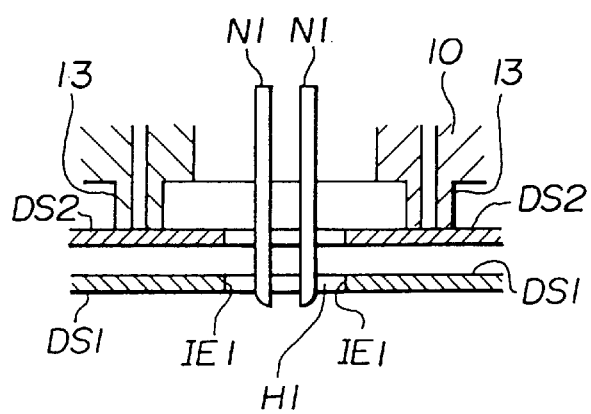
Figure 4B:
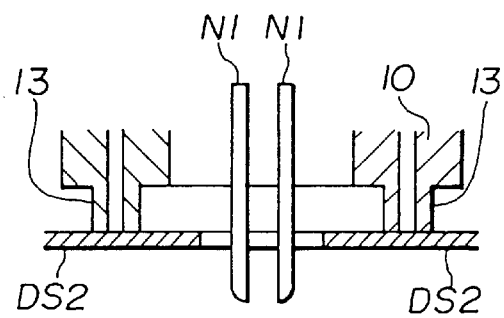
Figure 4E:
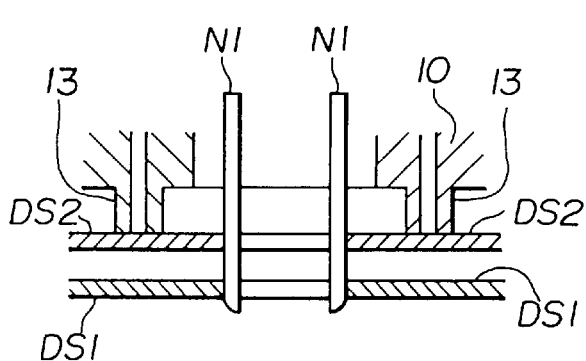
Figure 4C:
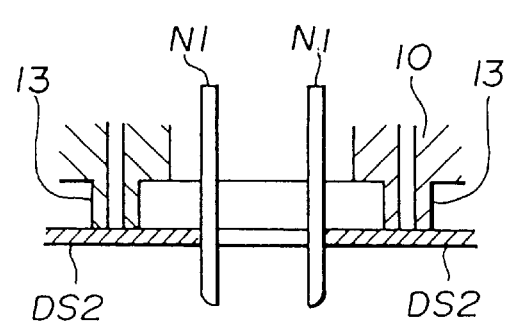

At the position P13, the dual disk holder 150 including the sucking and chucking devices 10 and 20 descends as a unit and the claws N1 of the chucking device 20 enter the center hole H2 of an upper side disk DS2 as shown in FIG. 4A. The dual disk holder 150 further descends until the suction pads 13 come in contact with the upper side disk DS2 as shown in FIG. 4B. Then, in this example, the sucking device 10 sucks the upper side disk DS2, and the mechanical chucking device 20 expands the claws N1 in the center hole H2 of the upper side disk DS2 as shown in FIG. 4C, and thereby adjusts the position of the disk DS2 so that the axis of the disk DS2 coincides with the center axis of the chucking device 20.

Then, the second drive section 30b of the transfer mechanism R1 swings the disk DS2 held with the disk holder 150 from the second disk standby position P13 to the first disk standby position P5 above a lower side disk DS1. At the first disk standby position P5, the first drive section 30a of the drive mechanism 30 lowers the disk DS2 until the vertical distance between the upper disk DS2 and the lower disk DS1 at the standby position P5 becomes equal to a predetermined clearance as shown in FIG. 4D. Then, by expanding its claws N1, the mechanical chucking device 20 adjusts the center of the lower disk DS1 and grasps the lower disk with the claws N1 expanded in the center hole of the disk DS1, as shown in FIG. 4E. In this way, the transfer mechanism R1 can control the vertical clearance between the lower and upper disks DS1 and DS2, and hold the lower and upper disks DS1 and DS2 in the confronting state.

Figure 4F:
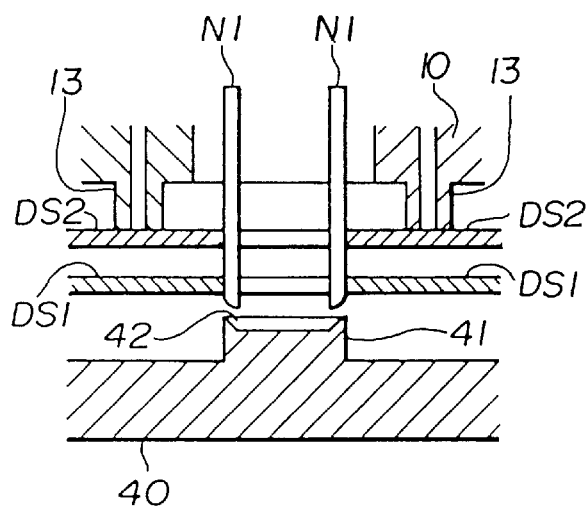

Then, the drive mechanism 30 moves the disk holder 150 holding the lower and upper disks DS1 and DS2 in the confronting state with the predetermined clearance, from the first disk standby position P5 to the position P14 or P16 of the coating section, and lowers the disk holder 150 toward a rotatable disk seat 40 of the spin coating unit in the coater house CH1 or CH2, as shown in FIG. 4F. The disk seat 40 of this example has a circular center boss or projection 41 for alignment, and the disk holder 150 guides the circular center holes H1 and H2 of the lower and upper disks DS1 and DS2 toward the center boss 41, as shown in FIG. 4F. In this state, the disks DS1 and DS2 and the center boss 40 are substantially coaxial with one another. In this example, the center boss 41 has a recess 42 formed in the top of the center projection 41, and the lower end of each claw N1 is tapered so that the radial distance of the outside surface of the claw from the center axis of the chucking device 20 becomes smaller toward the lower end. When the disk holder 150 further descends from the position shown in FIG. 4F, the tapered lower ends of the claws N1 enter the recess 42, and the claws N1. facilitate insertion of the center projection 41 into the center holes H1 and H2 of the disks DS1 and DS2. It is optional to make the top of the center projection 41 flat instead of forming the recess 42.

It is possible to perform the centering operation of expanding the claws N1 in the center hole of an upper side disk DS2 while the disk DS2 is sucked by the sucking device 10, or to perform the centering operation of the disk DS2 before the sucking operation of the disk DS2. Furthermore, it is optional to omit the centering operation by the claws N1. In this case, it is possible to provide a centering means for performing a centering operation for an upper side disk DS2 when the disk DS2 is placed at the position P12.

Each of the claws N1 shown in FIGS. 2A, 3 and 4A~4F is in a plain shape having no projection. These plain claws N1 can abut against the inner edges IE1 and IE2 of lower and upper disks DS1 and DS2 simultaneously, and hence grasp both of the lower and upper disks DS1 and DS2 without the help of the sucking device 10. After the chucking operation of the chucking device 20, therefore, the transfer mechanism R1 can cease the sucking operation of the sucking device 10, and carry the confronting disk pair of the lower and upper disks DS1 and DS2 only with the chucking device 20. In this case, specifically but not exclusively, it is possible to reduce slippage of the disks by employing rubber and other material having a high friction coefficient as the material of an abutting portion of each claw abutting on the inner edge of a disk.

Figure 3:
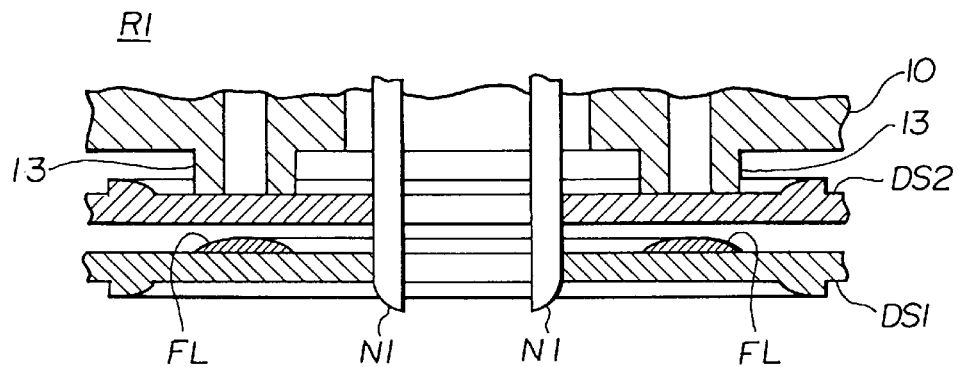
FIG. 3 is an enlarged view showing a main portion of a disk holder 150 of the disk transfer mechanism R1.

In the example shown in FIG. 3, the disk holder 150 holds the lower and upper disks DS1 and DS2 with such an intervening space that the annular adhesive layer FL formed on the lower side disk DS1 does not touch the upper disk DS2, and carries the disks DS1 and DS2 held in this state to the next position P14 or P16 in the coater house CH1 or CH2. Then, in the coater house CH1 or CH2, the upper disk DS2 is placed on the adhesive layer is on the lower disk DS1. The time required for this process is almost equal to the time of a process of carrying disks DS1 and DS2 after overlapping both disks with an adhesive layer sandwiched between both disks.

It is optional to provide a level adjusting means or adjuster 170, as shown in 2B, for adjusting the level or height of a lower disk DS1 at the standby position P5. In this example, the level adjusting means 170 is arranged to adjust the level of a lower disk DS1 by adjusting the level of a disk seat 171 at the position P5.

Figure 2C:
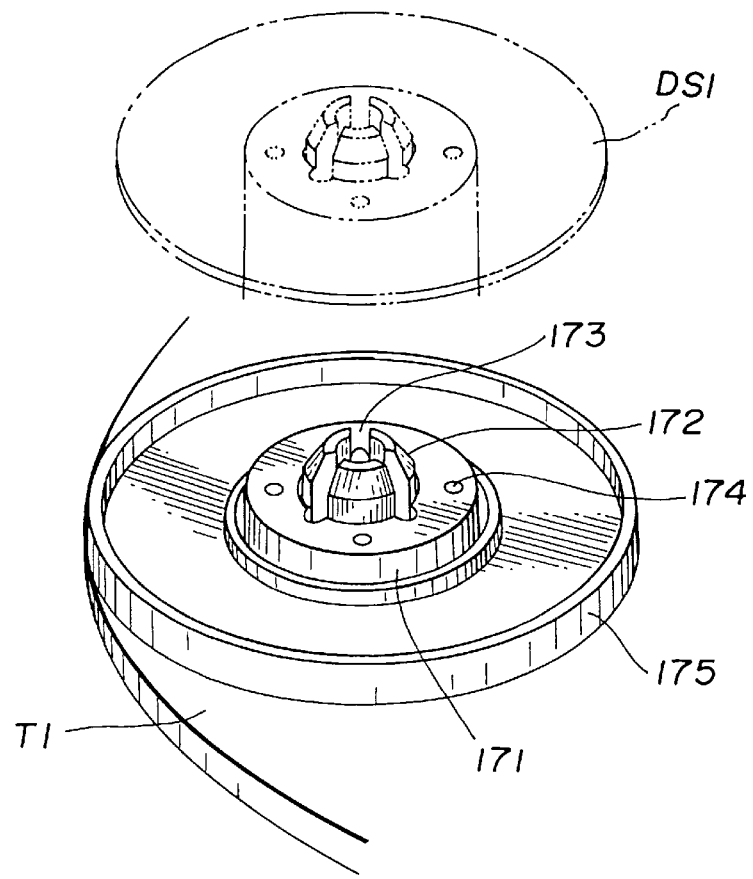
FIG. 2C is a perspective view showing an adjustable disk seat on a turntable T1 shown in FIG. 1.

The adjustable disk seat 171 of this example is shown in FIG. 2C. The disk seat 171 shown in FIG. 2C is received in a circular center hole of an annular pan 175 for catching drops of the liquid adhesive from a first disk DS1 or the adhesive supplying nozzle N. The disk seat 171 is movable up and down while the pan 175 is held stationary on the turntable T1. The disk seat 171 has a center boss 172 to be fitly inserted in the center hole of a first disk DS1. The center boss 172 is surrounded by an upwardly facing flat annular surface for abutting and supporting the downwardly facing surface of a first disk DS1. In this example, there are formed, in the annular flat surface, suction holes 174 for sucking the downwardly facing surface of a first disk DS1 to firmly position the first disk DS1. In this example, four of the suction holes 174 are arranged symmetrically around a vertical center axis of the disk seat 171.

The center boss 172 has three upright wall segments and three hollow segments (slots) 173 which are arranged alternately in a circle. The wall segments are arranged around an upright cylindrical center opening. The three hollow segments 173 open inwards into the center opening. The three hollow segments are open upward and adapted to receive the three claws of the mechanical chucking device 20, respectively. Each hollow section extends in the radial outward direction, slightly into the flat annular surface of the disk seat 171, and allows the radial movement of the corresponding claw to a limited extent.

In this example, three of the adjustable disk seats 171 are mounted on the turntable T1. Each disk seat 171 is moved up and down only at the standby position P5 to adjust the level of a first disk DS1 at the standby position P5.

The level adjusting means 170 of this example is arranged to vary the height (or up and down position) of the disk seat 171, and the speed of the up and down motion of the disk seat 171. In the state of FIG. 4D, the system can control the vertical clearance between lower and upper disks DS1 and DS2 by adjusting the level of the lower disk DS1 with the level adjusting means 170, and setting the level of the upper disk DS2 at a predetermined constant level.

The level adjusting means 170 of this example comprises a lifting drive mechanism having a servomotor. The lifting mechanism moves the disk seat 171 up and down, and determines the level of a disk DS1 in accordance with a preset level to control the clearance between the lower and upper disks DS1 and DS2. Moreover, the speed of operation of gripping the lower disk DS1 is determined in accordance with a preset speed of the lifting mechanism.

Figure 2D:
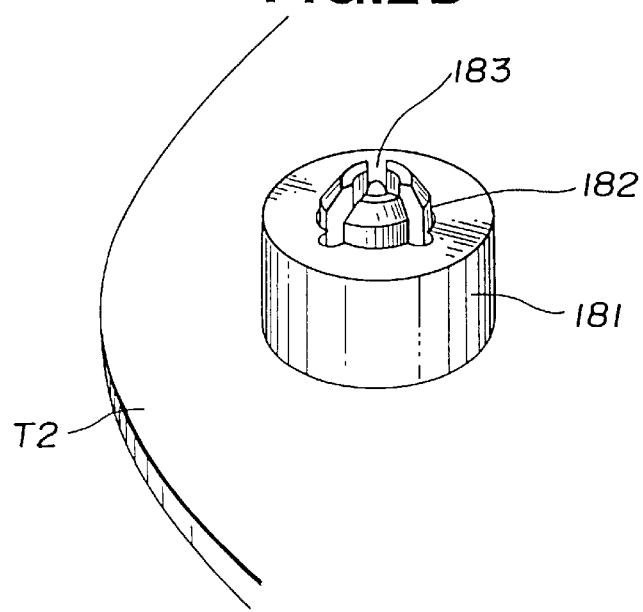
FIG. 2D is a perspective view showing a disk seat on a turntable T2 of FIG. 1.

FIG. 2D shows one of disk seats 181 mounted on the second turntable T2 of this example. The disk seats 181 are fixedly mounted on the second turntable T2. The disk seat 181 shown in FIG. 2D has a center boss 182 which has three hollows sections 183 for receiving the claws of the mechanical chucking device 20 like the center boss 172 shown in FIG. 2C. The center boss 182 is adapted to receive the claws from above, and allow the claws to move radially to a limited extent.

The control unit 100 may be a single unit or a combination of control units. When the level adjusting means 170 is employed, the combination of the level adjusting means 170 and the transfer mechanism R1 serves as a disk handling means for setting first and second disks DS1 and DS2 in the confronting state and for moving the first and second disks vertically relative to each other to control the clearance between the first and second disks.

Figure 5A:
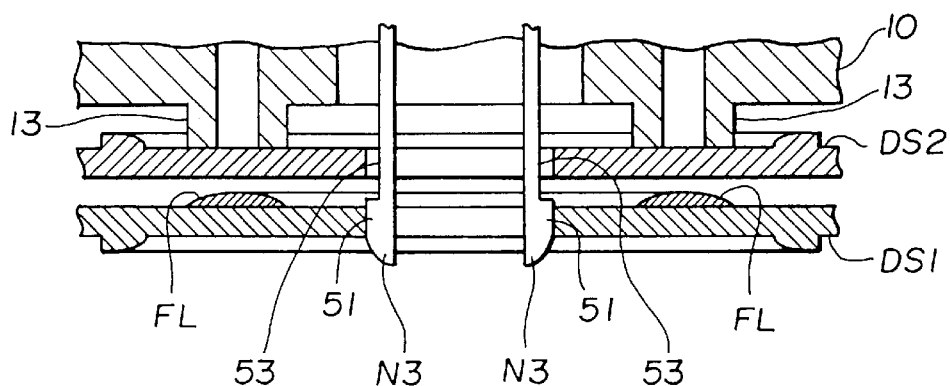
FIG. 5A is an enlarged view showing a disk transfer mechanism R12 that is a variation of the mechanism R1.
Figure 6A:
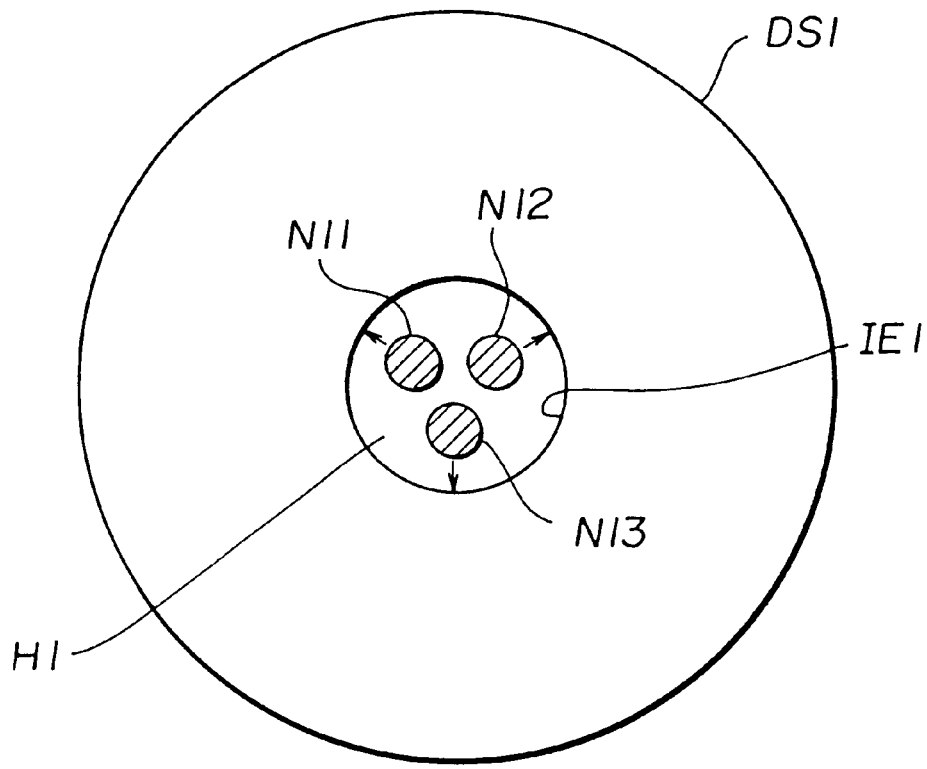
FIGS. 6A and 6B are views showing an arrangement of three chucking claws of the disk transfer mechanism R1 (or R12), and a center boss 60 formed in a rotatable disk seat of one example used in a unit CH1 or CH2 shown in FIG. 1.

FIG. 5A shows a main portion of a disk transfer mechanism R12 according to another practical example of the embodiment. The transfer mechanism R12 shown in FIG. 5A is different from the transfer mechanism R1 shown in FIG. 2A and 3 in that the transfer mechanism R12 has stepped claws N3.

Each of the stepped claws N3 has an upper claw portion 53 and a lower claw portion formed with an outward projection 51. The outward projection 51 of each claw N3 projects radially outwardly from the center axis of the chucking device or from the center of the radial symmetrical arrangement of the claws N3. The upper portions 53 of the claws N3 define a small diameter cylindrical surface, and the projections 51 of the claws N3 define a large diameter cylindrical surface coaxial with the small diameter cylindrical surface.

When the claws N3 are radially expanded, as shown in FIG. 5A, the projections 53 chuck the lower side disk DS1 by abutting against the inner edge of the lower disk DS1 while the upper claw portions 53 are out of contact with the inner edge of the upper disk DS2. Therefore, the stepped claws N3 are capable of gripping the lower disk DS1 in a reliable and stable manner even if the center holes of the upper and lower disks considerably differ in diameter due to disk to disk variation. In many cases, therefore, the stepped claws are preferable.

Figure 5B:
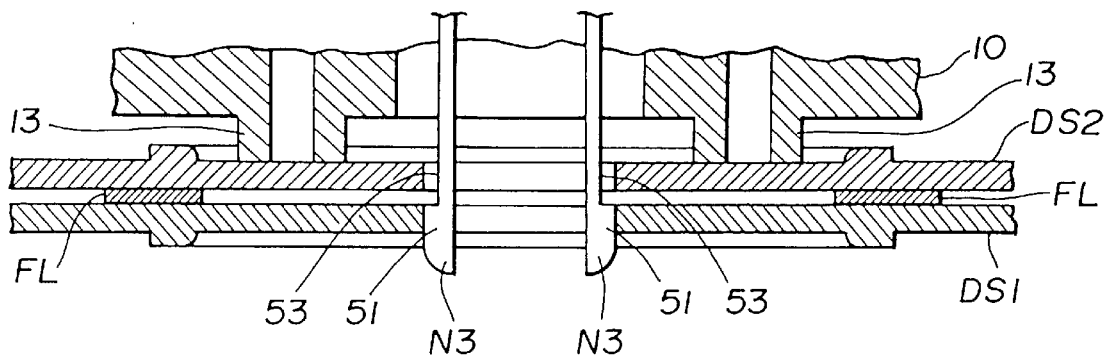
FIG. 5B is an enlarged view showing the disk transfer mechanism R12 holding an upper disk DS2 in contact with an adhesive layer FL on a lower disk DS1.

FIG. 5B shows the disk transfer mechanism R12 having the stepped claws N3 in an operating mode in which the vertical clearance between lower and upper disks DS1 and DS2 is reduced to put the adhesive layer FL on the lower disk DS1 in contact with the upper disk DS2. In many cases, the operating mode in which the adhesive layer FL is contiguously sandwiched between lower and upper disks DS1 and DS2 is advantageous.

In the transfer mechanism R12, it is possible to provide a clearance adjusting means 150c (as shown in FIG. 2B) for adjusting the vertical clearance between the lower disk DS1 held by the claws N3 of the chucking device 20 and the upper disk DS2 held by the sucking device 10. The clearance adjusting means 150c can adjust the height of the upper side disk DS2 independent of the height of the lower side disk DS1. With this adjusting means 150c, the system can adjust the clearance between lower and upper disks DS1 and DS2 during the transfer operation from the standby position P5 to the next spin coating position P14 or P16, and thereby further improve the processing speed and efficiency. The clearance adjusting means 150c of this example comprises a driving means for moving the mechanical chucking device 20 up and down relative to the outer case 11 of the sucking device 10.

The adjusting means 150c may be arranged to perform an adhesive contacting operation for putting the adhesive layer on the lower disk DS1 in contact with the upper disk DS2 by reducing the clearance between the disks while the arm of the second drive section 30b rotates the disk holder 150. The simultaneous process of the adhesive contacting operation and the disk transfer operation reduces the time required for the operation for overlapping lower and upper disks DS1 and DS2.

Figure 6B:
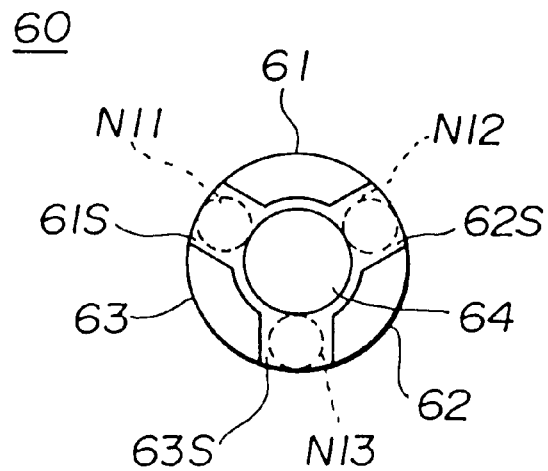

FIGS. 6A and 6B show another practical example in the embodiment according to the present invention.

As shown in FIG. 6A, the chucking device 20 has three claws N11, N12 and N13 for gripping a circular lower disk DS1 by expanding radially outwardly in the circular center hole H1 of the disk DS1. The three claws N11, N12 and N13 are arranged in a circle at regular angular distances of 120° in a manner of radial symmetry. The three claws N11, N12 and N13 can expand so as to increase the diameter of the circle while the three claws remains radially symmetrical. In the state of FIG. 6A, the center of the radial symmetry of the claws N11, N12 and N13 lies at the center of the disk DS1.

FIG. 6B shows a center boss or projection (or hub) 60 of a rotatable disk seat 40 of the spin coating unit in each coater house CH1 or CH2. The center boss 60 is a variation of the center boss 41 shown in FIG. 4F. The center boss 60 shown in FIG. 6B is designed to fit in the center holes H1 and H2 of lower and upper disks DS1 and DS2. The center boss 60 of this example includes three upright wall segments 61, 62 and 63 and three hollow space segments 61S, 62S and 63S, and a central vertical shaft 64. As shown in FIG. 6B, the horizontal section of each of the wall segments 61, 62 and 63 is in the form of a segment of an annulus bounded between arcs of two concentric circles. The wall segments 61 and 62 and 63 are arranged regularly around the vertical axis of the round center shaft 64. Each of the wall segments 61, 62 and 63 has outside and inside cylindrical surfaces. The outside cylindrical surfaces of the three wall segments 61, 62 and 63 are parts of the cylindrical surface of an upright regular circular outer cylinder. Similarly, the inside cylindrical surfaces of the three wall segments 61, 62 and 63 are parts of the cylindrical surface of an upright regular circular inner cylinder having a diameter smaller than the diameter of the cylinder defined by the outside surfaces. The diameter of the outer cylinder defined by the outside cylindrical surfaces of the wall segments 61, 62 and 63 is slightly smaller than the center hole diameter of disks DS1 and DS2. Each of the space segments 61S, 62S and 63S is a hollow region extending vertically between two adjacent wall segments, and opening upward. The three wall segments 61, 62 and 63 and the three space segments 61S, 62S and 63S are arranged alternately in a circle. These wall and space segments are arranged symmetrically around the center shaft 64 as shown in FIG. 6B. The space segments 61S, 62S and 63S are sized and arranged so as to receive the claws N11, N12 and N13, respectively as shown in FIG. 6B. In this example, each space segment 61S, 62S or 63S is open upward so as to receive one of the claws from above, and open radially outward so as to allow a movement of the claw in a radial direction.

At the position P14 or P16, the transfer mechanism R1 lowers the disk holder 150 holding lower and upper disks DS1 and DS2, and causes the disks DS1 and DS2 to fit over the center boss 60 by inserting the claws N11, N12 and N13 into the space segments 61S, 62S and 63S, respectively. In this way, the center boss 60 is smoothly inserted into the center holes of lower and upper disks DS1 and DS2, and the lower and upper disks DS1 and DS2 are overlapped correctly, and substantially coaxially.

In this embodiment, the disk fabricating process comprises an adhesive supplying step, a disk handling step, a coating step for spreading the adhesive between the first and second disks, and a curing step for curing the adhesive. These steps correspond to the adhesive supplying section, the disk handling section, the coating section and the curing section, respectively.

The disk handling step of this embodiment comprises a sucking sub-step for sucking a second disk DS2 at the second disk standby position P13, a first transfer sub-step for transferring the second disk from the position P13 to the first disk standby position P5 above a first disk DS1, a clearance adjusting sub-step for moving the first and second disks DS1 and DS2 vertically relative to each other to control the clearance between the first and second disks DS1 and DS2, a chucking sub-step for chucking the first disk, and a second transfer sub-step for transferring the first and second disks from the position P5 to one of the spin coating positions P14 and P16.

The chucking device 20 of the illustrated example has a plurality of internally chucking claws (N1, N2, N11, N12, N13) for chucking the inner border edges of a first disk. The chucking device 20 may be arranged to chuck the outer border edge (or periphery) of a first disk with a plurality of externally chucking claws. The chucking device may have both of the internally chucking claws and the externally chucking claws.

The disk transfer mechanism (R1, R12) according to this embodiment can improve the efficiency of the spin coating unit by reducing the time period during which the spin coating unit is not in operation for spinning, and hence improve the overall efficiency of the system. Furthermore, the disk transfer mechanism can prevent a spill of an adhesive of a low viscosity from the center hole of a disk, and reduce the time of the spin coating operation in the case of an adhesive of a high viscosity.

Figure 7:
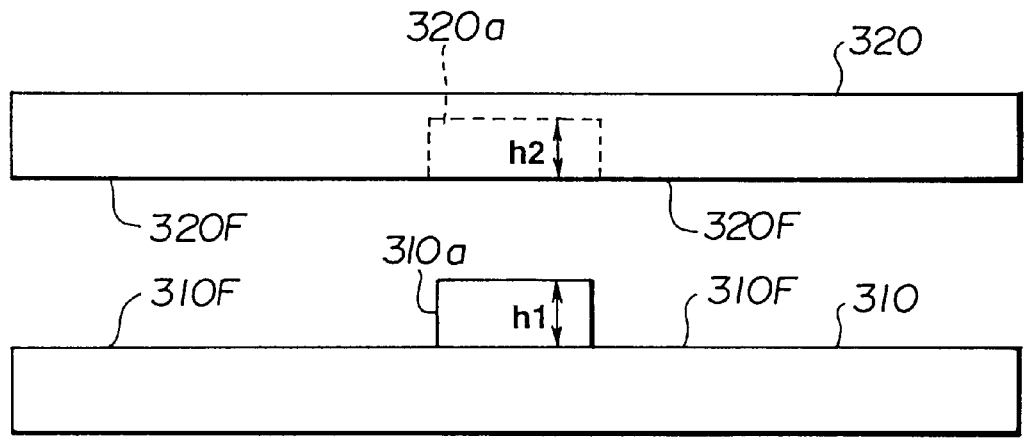
FIG. 7 is a front view showing a weighting or confining means W1 according to a first example used in the system of FIG. 1.

FIG. 7 shows a weighting or confining means (or member) W1 which, in this example, comprises the quartz base 310 and the quartz cover 320. The quartz base 310 has a flat upper surface 310F and a center upward projection 310a raised from the surrounding flat upper surface 310. The quartz cover 320 has a flat lower surface 320F and a center upward depression 320a depressed below the surrounding surface 320F.

Preferably, the quartz base 310 and cover 320 are in the form of a quartz plate of a radial symmetry. In this case, the projection and depression may be also radially symmetrical. In this example, the quartz base 310 and cover 320 are both circular, and the projection and depression 310a and 320a are also circular. The cylindrical projection 310a is coaxial with the circular quartz base 310. Similarly, the cylindrical depression 320a is coaxial with the circular quartz cover 320. The flat upper surface 310F is annular and perpendicular to the axis of the quartz base 310, and faces upward. The flat lower surface 320F is annular and perpendicular to the axis of the quartz cover 320 and faces downward in the state shown in FIG. 7. The diameter of the center depression 320a is greater than the diameter of the center projection 310a. The center depression 320a is designed to receive the center projection 310a loosely as shown in FIG. 8.

The height h1 of the center projection 310a of this example is set smaller than a sum (d+h2) resulting from addition of a predetermined thickness of a bonded disk DS3 to the depth h2 of the center depression 320a. Furthermore, the height h1 of the center projection 310a is slightly greater than the depth h2 of the center depression 320a. It is possible to set the difference between h1 and h2 equal to d. Therefore, 0<(h1−h2)≦d. The predetermined thickness d of the bonded disk DS3 is a result obtained by adding a predetermined thickness of an adhesive layer to the sum of the thickness of a lower disk DS1 and the thickness of an upper disk DS2.

In this example, the base and cover 310 and 320 are both circular and identical in outside diameter. In this example, the top of the projection 310a is flat, parallel to the flat surface 310F and perpendicular to the axis of the base 310. Similarly, the bottom of the depression 320a of this example is flat, parallel to the flat surface 320F and perpendicular to the axis of the cover 320.

Figure 8:
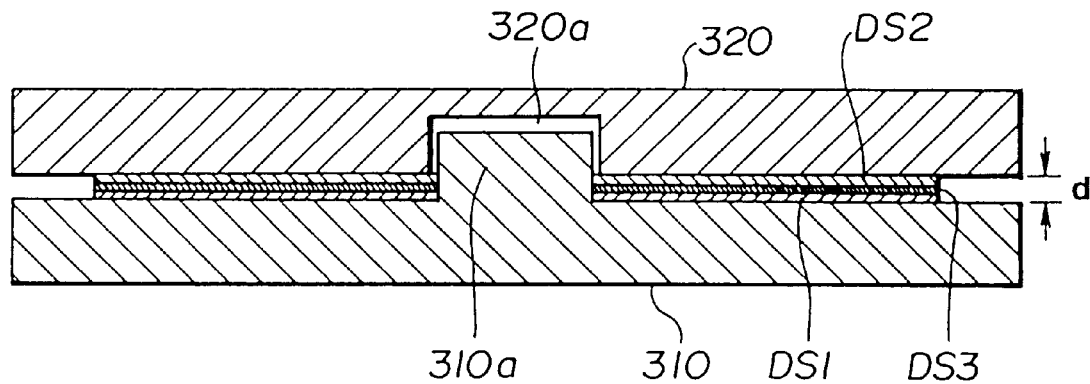
FIG. 8 is a vertical sectional view showing base and cover of the weighting means W1 between which a bonded disk DS3 is interposed.

FIG. 8 is a vertical sectional view showing a bonded disk DS3 sandwiched between the quartz base 310 and the quartz cover 320. The bonded disk DS3 interposed between the quartz base and cover 310 and 320 is passed through the ultraviolet irradiating unit UV1. By ultraviolet radiation, the liquid adhesive layer becomes hard. In this case, the weight of the quartz cover 320 prevents undesired deformation of the bonded disk DS3 due to heat or other factors.

In the state of FIG. 8, the center projection 310a is inserted in the center hole of the bonded disk DS3, the flat lower surface of the bonded disk DS3 is in contact with the flat upper surface 310F of the quartz base 310, and the flat upper surface of the bonded disk DS3 is in contact with the flat lower surface 320F of the quartz cover 320. The upper and lower surfaces 310F and 320F are substantially horizontal and parallel, and the spacing between the upper and lower surfaces 310F and 320F is substantially equal to the thickness d of the bonded disk DS3 defined between the upper and lower flat surfaces of the bonded disk DS3.

Figure 9:
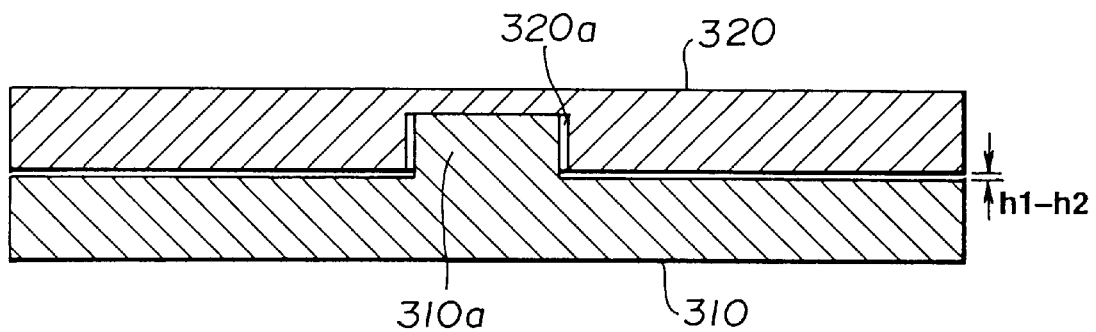
FIG. 9 is a vertical sectional view showing the base and cover of the weighting means W1 with no interposition of a bonded disk.

FIG. 9 shows the quartz cover 320 placed on the quartz base 310 without the interposition of a bonded disk DS3. In this state, the flat top of the center projection 310a is in contact with the flat bottom of the center depression 320a as shown in FIG. 9, and the flat upper and lower surfaces 310F and 320F are parallel to each other. However, the confronting flat surfaces 310F and 320F of the base and cover 310 and 320 are held out of contact with each other because of the height h1 of the projection 310a being slightly greater than the depth h2 of the depression 320a. The spacing between the upper and lower surfaces 310F and 320F is equal to (h1−h2). The cover 320 is in contact with the base 310 only in the depression 320a. Therefore, it is easy to remove the cover 320 from the base 310. In this example, the center projection 310a and the center depression 320a serve as a means for spacing the upper and lower surfaces 310F and 320F of the weighting means W1.

Figure 10:
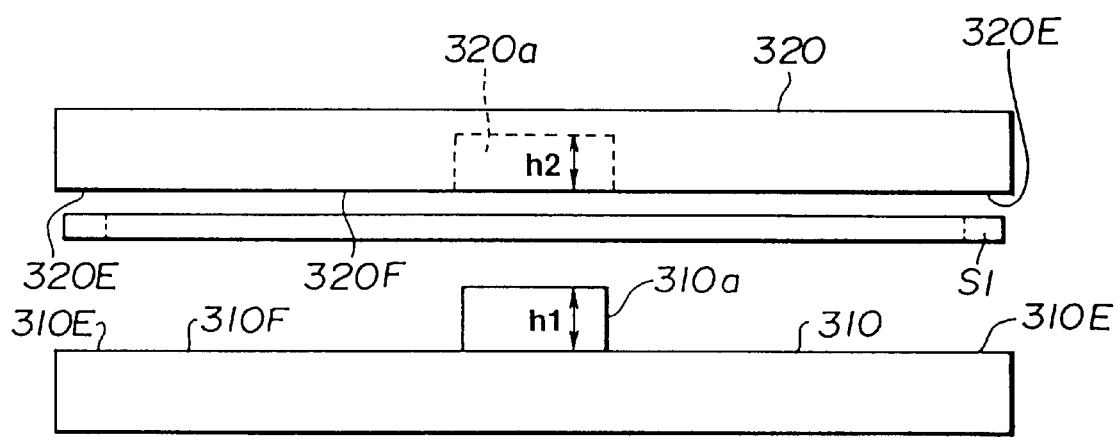
FIG. 10 is a front view showing a weighting or confining means W2 according to a second example.

FIG. 10 shows a weighting or confining means W2 according to another example. The weighting means W2 comprises an annular spacer S1 in addition to the quartz base and cover 310 and 320 of the weighting means W1 shown in FIGS. 7, 8 and 9. The annular spacer S1 is interposed between the base and cover 310 and 320. A bonded disk DS3 is surrounded by the annular spacer S1 between the base and cover 310 and 320. The annular spacer S1 has parallel upper and lower flat annular surfaces. The thickness of the annular spacer S1 is made equal to or greater than the predetermined thickness d of the bonded disk DS3. The annular spacer S1 is placed between an outer peripheral portion 310E of the base 310 and an outer peripheral portion 320E of the cover 320. The annular spacer S1 serves as the spacing means.

Figure 11:
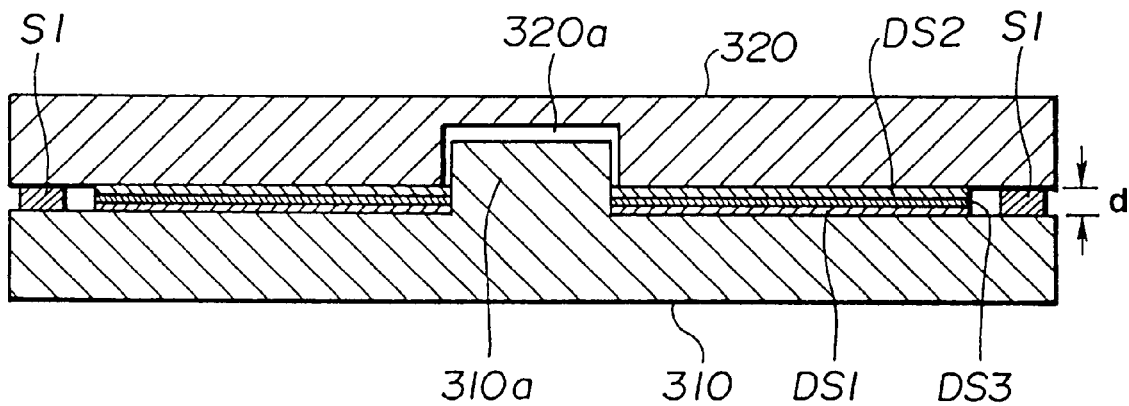
FIG. 11 is a vertical sectional view showing base and cover of the weighting means W2 with the interposition of a bonded disk DS3.

FIG. 11 shows a bonded disk DS3 enclosed in the weighting means W2. Between the base and cover 310 and 320, the bonded disk DS3 is encircled by the annular spacer S1. The spacer S1 prevents the adhesive from being forced out excessively from the interspace between the lower and upper disks DS1 and DS2, and by so doing, prevents the adhesive layer from becoming too thin. Thus, the spacer S1 can provide a uniformly cured layer of the adhesive, and reduce the strain in the curing or solidifying process. The inside diameter of the annular spacer S1 is greater than the outside diameter of the bonded disk DS3, and there remains a narrow annular space between the bonded disk DS3 and the spacer S1.

When the cover 320 having a considerable weight is placed directly on the bonded disk DS3 without the spacer S1, the cover 320 tends to squeeze the adhesive excessively from the bonded disk DS3. In the state of FIG. 11, the spacer S1 determines the vertical spacing (or distance) between the confronting flat surfaces 310F and 320F of the base and cover 310 and 320, holds the confronting flat surfaces 310F and 320F parallel to each other, and prevents the load of the cover 320 from being directly applied on the bonded disk DS3. Thus, the spacer S1 prevents the adhesive layer from becoming too thin.

The adhesive forced out of the interspace between the lower and upper disks DS1 and DS2 of the bonded disk DS3 adheres to the base and cover 310 and 320, solidifies and forms an irregular covering. Such a covering of the adhesive deteriorates the transmittance of the ultraviolet radiation, and makes the adhesive setting nonuniform. Furthermore, the surfaces 310F and 320F covered with the irregular adhesive covering can not distribute the load of the cover uniformly, but incurs undesired concentration of the load at the adhesive covering and an increase of strain during solidification. The spacer S1 can avoid these problems by preventing the adhesive from being forced out of the bonded disk. The protrusion of the adhesive from a bonded disk DS3 makes the outer circumference of the disk DS3 rugged. The irregular periphery of the bonded disk DS3 is undesirable especially in the case of DVD because a device for reading out information from a DVD is generally arranged to drive the DVD disk with a driving means contacting the periphery of the disk. In this point, too, the spacer S1 is advantageous.

Figure 12:
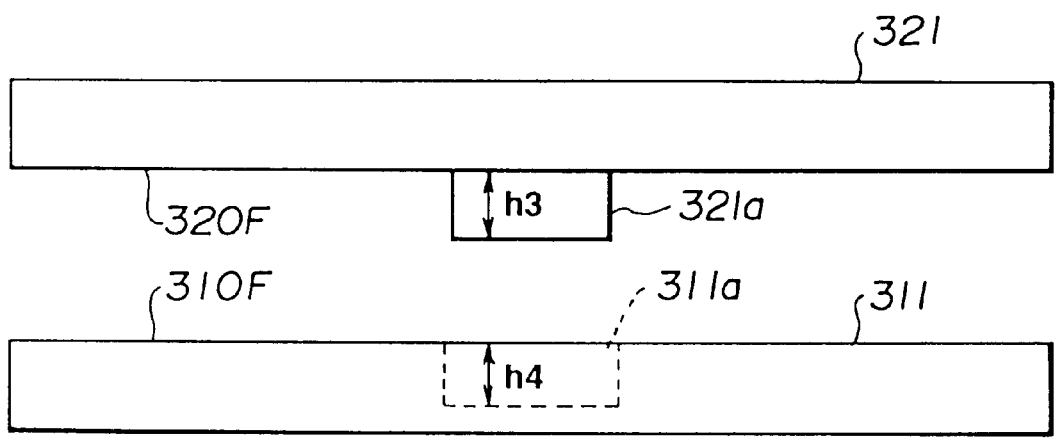
FIG. 12 is a front view showing a weighting or confining means W3 of a third example.

FIG. 12 shows a weighting or confining means W3 of still another example. The weighting means of this example includes a quartz base 311 formed with a center downward depression 311a, and a quartz cover 321 formed with a center downward projection 321a. As in the preceding examples, the quartz base 311 has an upwardly facing flat surface 310F, and the quartz cover 321 has a downwardly facing flat surface 320F. The base and cover 320 and 321 of this example are in the form of a circular quartz plate and the center depression and projection 311a and 321a are cylindrical.

The height h3 of the center downward projection 321a is smaller than the sum (d+h4) of the preset thickness d of the bonded disk DS3 and the depth h4 of the center depression 311a. The height h3 of the downward projection 321a is slightly greater than the depth h4 of the depression h4. That is, 0<(h3−h4)<d.

Figure 13:
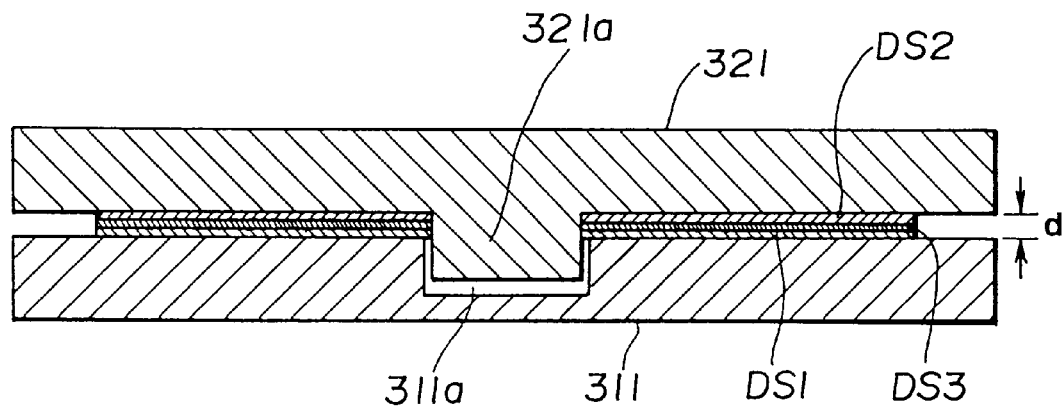
FIG. 13 is a vertical sectional view showing base and cover of the weighting means W3 with a bonded disk DS3 placed therebetween.

FIG. 13 shows a bonded disk DS3 between the quartz base 311 and the quartz cover 321.

Figure 14:
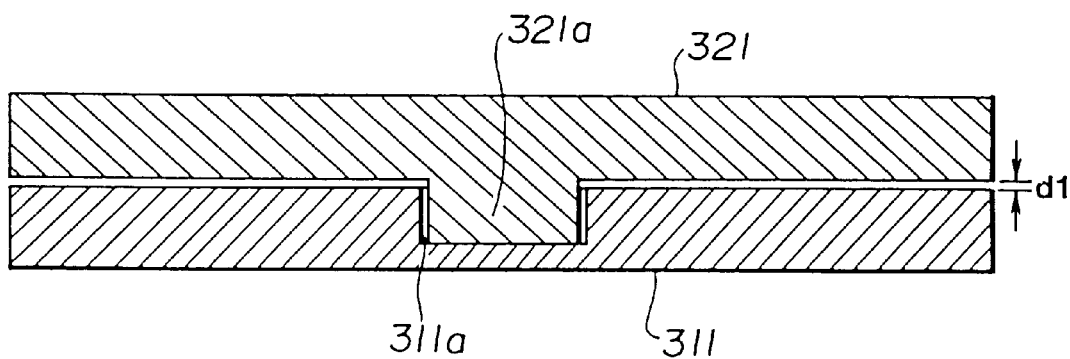
FIG. 14 is a vertical sectional view of the base and cover of the weighting means W3 with no bonded disk DS3.

FIG. 14 shows the quartz cover 321 placed directly on the quartz base 311 without the interposition of a bonded disk DS3. The downwardly facing flat top of the center projection 321a is in contact with the upwardly facing flat bottom of the center depression 311a, but the surrounding flat surfaces 310F and 320F are held parallel to each other, and spaced from each other by a spacing d1, as in the example shown in FIG. 9. Therefore, the cover 321 can be readily removed from the base 311.

Figure 15:
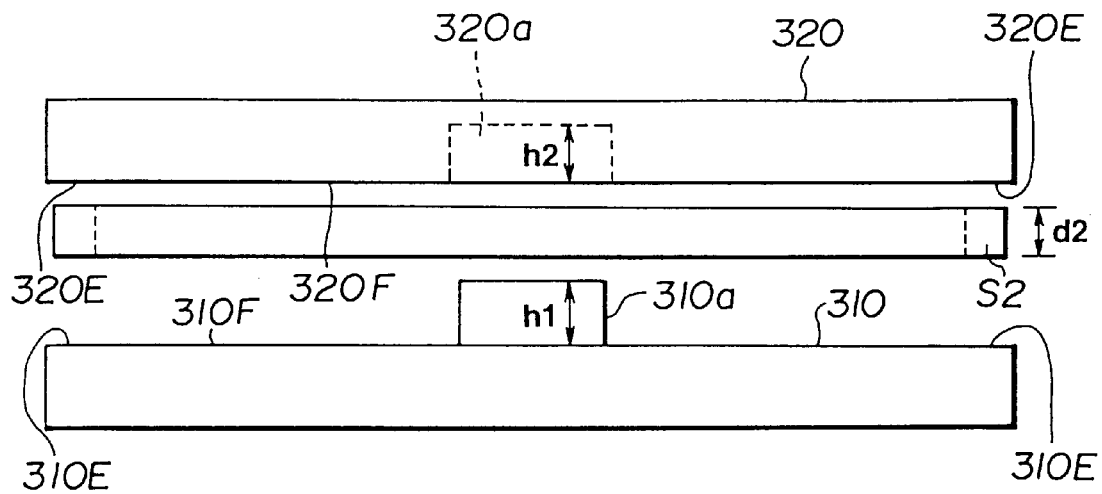
FIG. 15 is a front view showing a weighting or confining means W4 according to a fourth example.

FIG. 15 shows a weighting or confining means W4 according to still another example. The weighting means W4 is different from the weighting means W2 in that the annular spacer S1 is replaced by an annular spacer S2.

The thickness d2 of the spacer S2 of this example is smaller than the sum of the predetermined thickness of a bonded disk and a maximum allowable amount of deformation of a bonded disk along a thickness direction of the bonded disk.

Figure 16:
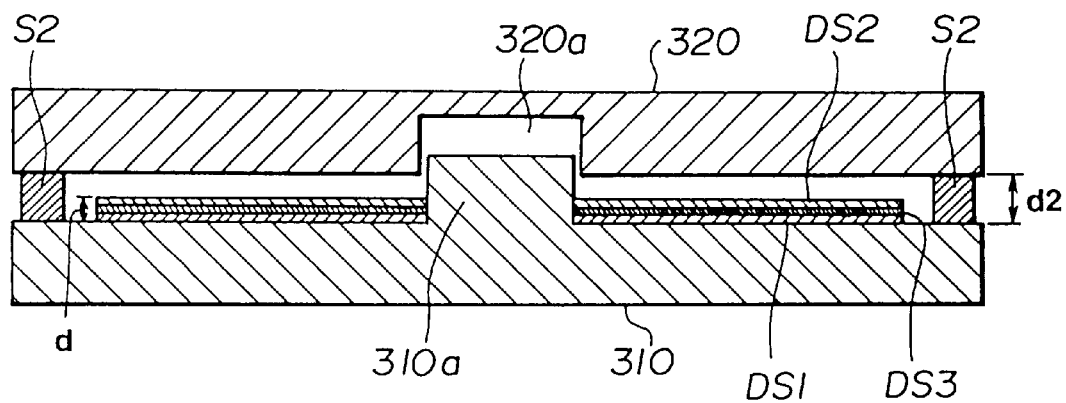
FIG. 16 is a vertical sectional view showing base and cover of the weighting means W4, and a bonded disk between the base and cover.

FIG. 16 shows a bonded disk DS3 placed between the quartz base 310 and the quartz cover 320 and surrounded by the annular spacer S2. The quartz cover 320 is spaced from the bonded disk DS1 in the example shown in FIG. 16. If the bonded disk DS3 is deformed, during the ultraviolet irradiating operation, along the thickness direction, that is, the axial direction of the disk, the amount of deformation is limited to the maximum allowable amount by the quartz cover 320. The weighting means W4 can reliably contain the deformation of disks along the thickness direction or the variation of the axial dimension of disks within a predetermined allowable range, and facilitate the control of the disk deformation. In the state of FIG. 16, the top of the center projection 310a is within the center depression 320a. The spacer S2 serves as the spacing means.

The annular spacer S1 may be formed as a unit with either of the quartz base and cover 310 and 320. Similarly, the annular spacer S2 may be formed as a unit with the quartz base 310 or the quartz cover 320. The spacer integral with the base or cover can facilitate the operations of the transfer arms A1, A2, A3 and A4.

In this embodiment, as mentioned before, the eight quartz bases 310 (or 311) are arranged in a circle on the turntable T3.

When the annular spacer S1 or S2 is employed, it is possible to eliminate the complementary center projection and depression from the base and cover. In this case, the spacer separates the flat surfaces of the base and cover, and makes it easy to remove the cover from the base. The spacer has at least one abutting surface for abutting on the quartz base or cover. It is optional to form a plurality of grooves and/or holes in the abutting surface of the spacer to further facilitate the removal of the cover from the base.

The combination of the complementary center projection and depression can prevent an unwanted shift of the cover relative to the base due to a centrifugal force and an inertial force caused by the rotation of the turntable T3. The centrifugal force and the inertial force caused by the rotational movement of the turntable T3 act on the cover, and these forces are significantly strong when the cover is much heavier than a bonded disk. Without the center projection and depression, the resultant of the centrifugal force in the radial direction and the inertial force in the rotational direction acts on the cover, and the second disk DS2 under the cover tends to slip on the uncured adhesive layer, relative to the first disk. The center projection received in the center depression can prevent such an undesired slippage even when the rotational speed of the turntable is relatively high.

When the rotational speed of the turntable T3 is lower than a predetermined low speed, the centrifugal and inertial forces are not so influential. Therefore, it is possible to eliminate the center depression and employ only the center projection. That is, one of the base and cover is formed with a center projection and the other is formed with an entirely flat surface with no depression.

In this case, it is optional to make the height of the center projection equal to or greater than the predetermined thickness of a bonded disk, and equal to or smaller than the sum of the predetermined thickness of a bonded disk and the maximum allowable amount of deformation of a bonded disk along the thickness direction. The center projection of the thus-determined height prevents the quartz cover from pressing a bonded disk too hard, and the adhesive layer from becoming too thin.

The spacing means (310a, 311a, 320a, 321a, S1, S2) prevents the quartz base and cover from adhering to each other.

Figure 17:
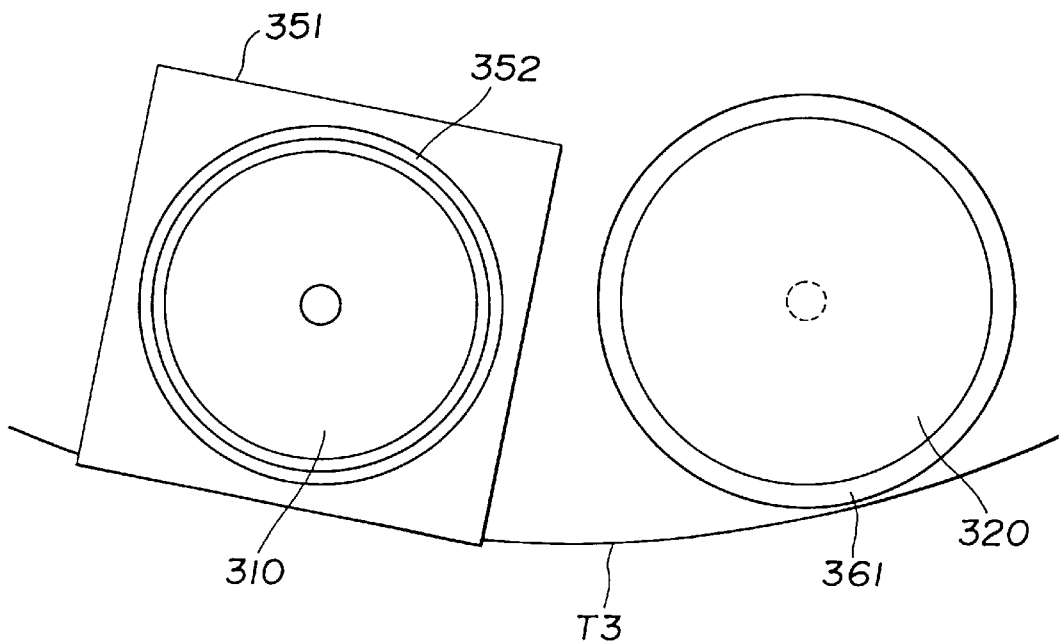
FIG. 17 is a plan view showing support members 351 and 361 mounted on a turntable T3 shown in FIG. 1.
Figure 18:
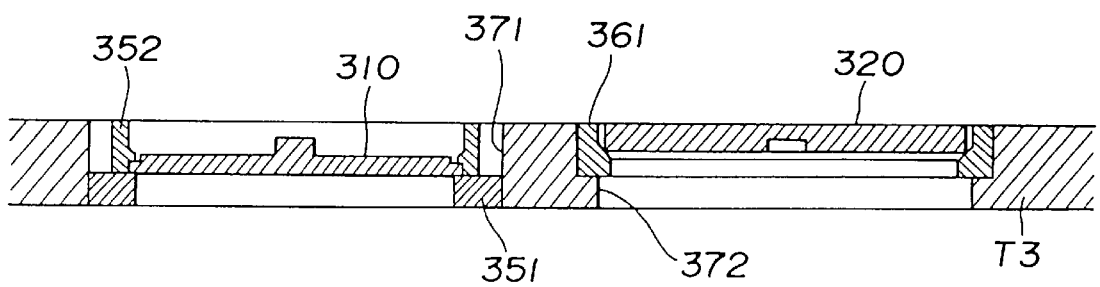
FIG. 18 is a sectional view showing the support members 351 and 361 mounted on the turntable T3.

FIGS. 17 and 18 shows one of the quartz bases 310 and one of the quartz covers 320 on the third turntable T3. The quartz base 310 of FIGS. 17 and 18 is supported on a support frame member 351 fixed in a window (or opening) 371 of the turntable T3, and fixed on the support member 351 by a fixing frame 352. The quartz cover 320 is placed on a support frame member 361 fixed in a window or opening 372 of the turntable T3. In the example shown in FIGS. 17 and 18, the support frame member 351 is a square member having a circular center hole, and the support frame member 361 is an annular member. The quartz base 310 is supported only at the outer periphery by the support frame member 351, and the quartz cover 320 is supported only at the outer periphery by the support member 361. In this example, the eight support members 351 and the eight support members 361 are alternately arranged on the turntable T3. Similarly, the eight windows 371 and the eight windows 372 are alternately formed in the turntable T3.

It is optional to make the shape of the support members 351 circular instead of a square shape. The support members 351 and/or 361 may be integral parts of the turntable T3. In this example, the quartz covers are placed on the support members 361. However, it is possible to place the quartz covers directly on the turntable T3. It is possible to omit the quartz covers. In this case, a bonded disk DS3 is placed on one quartz base without being covered by a quartz cover.

Figure 19:
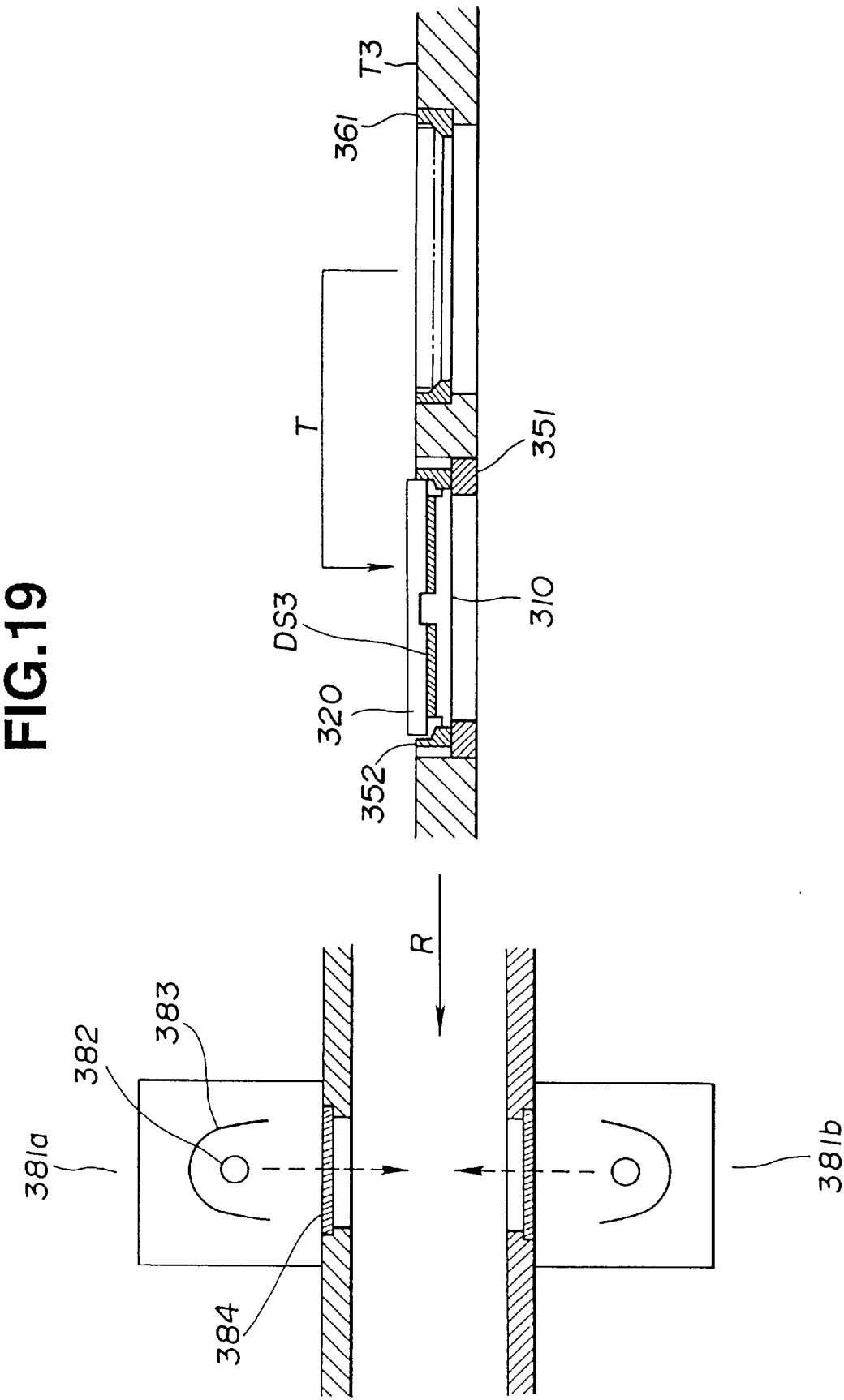
FIG. 19 is a sectional view showing upper and lower ultraviolet lamps of an ultraviolet irradiating unit UV1 shown in FIG. 1 for exposing a bonded disk DS3 on the turntable T3 to ultraviolet rays.

FIG. 19 shows one of the first and second ultraviolet lamp unit L1 and L2 of the irradiating unit UV1. The lamp unit L1 or L2 shown in FIG. 19 has an upper unit 381a and a lower unit 381b between which the turntable T3 rotates. Each of the upper and lower units 381a and 381b includes an ultraviolet lamp 382, a reflector 383 for directing ultraviolet rays in a downward direction in the case of the upper unit 381a or in an upward direction in the case of the lower unit 381b, and an infrared filter 384 for reflecting infrared radiation to reduce the heat transfer by radiation to a bonded disk DS3. The quartz cover 320 is transferred from the position on the support member 361 and placed on a bonded disk DS3 on the quartz base 310 as shown by an arrow T in FIG. 19. Then, the turntable T3 rotates in a direction shown by an arrow R in FIG. 19. The bonded disk DS3 sandwiched between the quartz base and cover 310 and 320 passes between the upper and lower units 381a and 381b, and receives ultraviolet radiation from the upper unit 381a and the lower unit 381b. It is optional to omit either of the upper and lower units 381a and 381b, or to make the irradiating powers of the upper and lower units 381a and 381b different from each other.

What is claimed is:

1. A disk fabricating system for forming a single disk by bonding first and second disks, said system comprising:
   an adhesive supplying section for supplying a liquid adhesive to the first disk;
   a disk handling section for arranging the first and second disks in a confronting state in which the first and second disks confront each other and the adhesive supplied to the first disk is interposed between the first and second disks, and for transferring the first and second disks so that the first and second disks remain in the confronting state; and
   a coating section for receiving the first and second disks from the disk handling section, and spreading the liquid adhesive between the first and second disks by a centrifugal force;
   wherein the adhesive supplying section and the coating section are spaced apart from each other, and the disk handing section transfers the first and second disks from a position of the adhesive supplying section to a position of the coating section so that the first and second disks remain in the confronting state.

2. A disk fabricating system for forming a single disk by bonding first and second disks, said system comprising:
   an adhesive supplying section for supplying a liquid adhesive to the first disk:
   a disk handling section for arranging the first and second disks in a confronting state in which the first and second disks confront each other and the adhesive supplied to the first disk is interposed between the first and second disks, and for transferring the first and second disks so that the first and second disks remain in the confronting state; and
   a coating section for receiving the first and second disks from the disk handling section, and spreading the liquid adhesive between the first and second disks by a centrifugal force;
   wherein said disk handling section comprises a disk holding member for holding the first and second disks in the confronting state in which the first and second disks are spaced apart from each other and the first and second disks confront each other, and for maintaining the confronting state while said disk handling section transfers the first and second disks to said coating section.

3. A system as claimed in claim 2 wherein, in the confronting state, the second disk is separated from the first disk by an intervening space, and a distance between the first and second disks is equal to or greater than a height of an adhesive layer formed on the first disk so that the adhesive layer is in one of a contacting state in which the adhesive layer is in contact with the second disk and a non-contacting state in which the adhesive layer is out of contact with the second disk.

4. A system as claimed in claim 3 wherein, in the confronting state, the first and second disks are substantially horizontal, parallel to each other and coaxial with each other, and the second disk is above the first disk.

5. A system as claimed in claim 2 wherein said system further comprises a curing section for curing the adhesive spread between the first and second disks by said coating section.

6. A system as claimed in claim 5 wherein said disk handling section comprises a disk handling means for setting the first and second disks in the confronting state by placing the second disk just above the first disk, for moving said first and second disks vertically relative to each other until a vertical distance between the first and second disks is reduced to a preset distance, for gripping the first and second disks so that the confronting state is maintained, and moving the first and second disks to the coating section by holding the first and second disks in the confronting state.

7. A system as claimed in claim 6:
   wherein said adhesive supplying section comprises an adhesive supplying unit for supplying the adhesive on a plurality of the first disks sequentially;
   wherein said disk handling section comprises a first disk setting subsection for setting the first disks supplied with the adhesive at a first disk standby position one by one, and a second disk setting subsection for setting a plurality of the second disks one by one at a second disk standby position; and
   wherein said disk handling section further comprises a disk transfer mechanism for sequentially making a plurality of disk pairs each comprising one of the first disks and one of the second disks by moving each second disk from the second disk standby position to the first disk standby position above a unique one of the first disks, for setting the first and second disks of each pair in the confronting state and for carrying each pair to the coating section.

8. A system as claimed in claim 7 wherein said coating section comprises first and second spin coating units, and said disk handling section comprises a disk moving means for sequentially transferring the plurality of said disk pairs in the confronting state, alternately to said first and second spin coating units.

9. A system as claimed in claim 8:
wherein said disk moving means of said disk handling section comprises a swinging means for transferring each disk pair to one of said first and second spin coating units by rotating about a vertical swing axis, and said first and second standby positions and locations of said first and second spin coating units are arranged in a circle around said vertical swing axis;
wherein said first and second spin coating units are located on a first side of the swing axis of said swinging means and said first and second standby positions are located on a second side of the pivot axis opposite to the first side; and
wherein said disk handling means comprises a controlling means for alternating said swinging means between a first mode in which said swinging means swings from said second standby position in a first rotational direction to said first standby position, then from said first standby position in said first rotational direction to said first spin coating unit, and then from said first spin coating unit in a second rotational direction opposite to said first rotational direction back to said second standby position, and a second mode in which said swinging means swings from said second standby position in said first rotational direction to said first standby position, then from said first standby position in said second rotational direction through said second standby position to said second spin coating unit, and then from said second spin coating unit in said first rotational direction to said second standby position.

10. A system as claimed in claim 9 wherein said disk handling means comprises said disk transfer mechanism which comprises said disk holding member, said disk moving means which comprises said swinging means for rotating said disk holding member, and a disk lifting means for moving said disk holding member up and down.

11. A system as claimed in claim 10 wherein said disk holding member comprises a clearance adjusting means for adjusting a vertical clearance between the first and second disks held in the confronting state by said disk holding member.

12. A system as claimed in claim 10 wherein said disk handling means comprises said transfer mechanism and a disk seat level adjusting means for adjusting a height of each of said first disks resting at said first standby position, and said disk seat level adjusting means is separate from said disk transfer mechanism.

13. A system as claimed in claim 7 wherein said disk holding member comprises a second disk gripping means for gripping one of the second disks and a first disk gripping means for gripping one of the first disks.

14. A system as claimed in claim 13 wherein said second disk gripping means comprises a means for sucking one of the second disks, and said first disk gripping means comprises claws for holding each first disk by expanding in a center hole of each first disk; wherein said coating section comprises a spin coating unit comprising a rotating disk seat having a center boss for fitting in the center hole of one of the first disks and a center hole of one of the second disks, and wherein said adhesive supplying section comprises an adhesive supplying nozzle for supplying a predetermined amount of the adhesive so as to form a ring-shaped adhesive layer on each of the first disks.

15. A system as claimed in claim 7 wherein said curing section comprises a weight putting subsection for putting a weight cover on a bonded disk of one first disk and one second disk bonded with the adhesive by said coating section, and an ultraviolet irradiating subsection for irradiating ultraviolet rays to the bonded disk under said weighting cover to cure an adhesive layer between the first and second disks of the bonded disk.

16. A system as claimed in claim 15 wherein the weight cover is made of material transparent to ultraviolet radiation; wherein said curing section further comprises a disk carrying unit which is in a form of a turntable for carrying the bonded disk from said weight putting subsection to said ultraviolet irradiating subsection, a bonded disk supplying subsection for receiving the bonded disk from said coating section and for placing the bonded disk on said disk carrying unit, a weight removing subsection for removing the weight cover from the bonded disk and placing the weight cover on said disk carrying unit, a bonded disk unloading subsection for unloading the bonded disk from said disk carrying unit, and a cooling subsection for cooling the weight cover on said disk carrying unit; and wherein said curing section comprises a plurality of bases each for underlying the bonded disk, each of said bases is transparent to the ultraviolet radiation, said ultraviolet irradiating subsection comprises an ultraviolet lamp pair for irradiating the ultraviolet rays through the base underlying the bonded disk and through the cover overlying the bonded disk, and said turntable comprises a plurality of spaces each for storing the weight cover, and said bases and said spaces are arranged alternately in a circle on said turntable about a vertical axis of said turntable.

17. A system as claimed in claim 2 wherein said disk holding member comprises a second disk gripping means for gripping the second disk and a first disk gripping means for gripping the first disk; and wherein said second disk gripping means comprises a sucking means for sucking the second disk, and said first disk gripping means comprises a mechanical chucking device for holding the first disk by expanding in a center hole of the first disk.

18. A system as claimed in claim 17 wherein said mechanical chucking device comprises a plurality of adjustable claws for moving radially outwardly to chuck an inner border of the first disk.

19. A system as claimed in claim 18 wherein said claws of said mechanical chucking device extend vertically, and each of said claws comprises a lower portion for entering the center hole of the first disk through the center hole of the second disk held above the first disk.

20. A system as claimed in claim 19 wherein said sucking means comprises a plurality of suction pads for sucking an upwardly facing surface of the second disk, and said suction pads are arranged around said claws; and wherein said claws are arranged around a vertical center axis of said chucking device, and said chucking device chucks the first disk by moving said claws radially away from said center axis until said claws abut against the inner border of the first disk, the inner border of the first disk defining the center hole of the first disk which is a circular hole.

21. A system as claimed in claim 20 wherein each of said claws comprises the lower portion for centering and holding the first disk by abutting against the inner border of the first disk so as to make an axis of the first disk coincides with said center axis of said chucking device, and an upper portion for centering the second disk by abutting against the inner border of the second disk so as to make an axis of the second disk coincides with said center axis of said chucking device, said upper portions of said claws are located above said lower portions of said claws, said upper portions are arranged equidistantly around the center axis of said of said chucking device so that said upper portions are equal in a radial distance from the center axis of said chucking device, and said lower portions are arranged equidistantly around the center axis of said of said chucking device so that said lower portions are equal in a radial distance of from the center axis of said chucking device.

22. A system as claimed in claim 21 wherein said disk holding member comprises an outer case having a bottom formed with a hole, said suction pads project downward from said bottom, said chucking device is enclosed in said outer case, said claws extend vertically through said hole of said outer case, said claws are arranged around the center axis of said chucking device in a manner of radial symmetry, and said chucking device centers each disk by moving said claws radially away from the center axis of said chucking device in the manner of radial symmetry.

23. A system as claimed in claim 21 wherein said disk handling section comprises a moving means for moving said disk holding member and a controlling means for causing said sucking means to suck the second disk, for causing said moving means to move the second disk to a position just above the first disk, and to make a vertical clearance between the first and second disks equal to a preset distance by moving said disk holding member holding the second disk, and for causing said chucking device to chuck the first disk located right below the second, said controlling means controlling the vertical clearance between the first and second disks by controlling said sucking means, said moving means and said chucking means.

24. A system as claimed in claim 23 wherein said controlling means includes a means for centering the second disk by setting said disk holding member in such a contact position that said suction pads are in contact with the second disk and said claws are inserted in the center hole of the second disk, and by expanding said claws in the center hole of the second disk.

25. A system as claimed in claim 24 wherein each of said lower portions of said claws is formed with an outward projection having an abutting surface facing radially outwardly.

26. A system as claimed in claim 25 wherein each of said upper portions has an abutting surface facing radially outwardly, and said abutting surfaces of said lower portions are arranged in a larger circle around the center axis of said chucking device whereas said abutting surfaces of said upper portions are arranged around the center axis in a smaller circle which is smaller in diameter than the larger circle.

27. A system as claimed in claim 23 wherein said disk handling section comprises an adjustable disk seat for receiving the first disk, and a disk seat level adjusting means for moving the disk seat vertically, and for varying speed of the vertical motion of the disk seat, and said controlling means includes a means for controlling the vertical clearance between the first and second disk by controlling said seat level adjusting means.

28. A system as claimed in claim 17 wherein said coating section comprises a rotatable disk seat comprising a center boss for holding the first and second disks by entering the center holes of the first and second disks.

29. A system as claimed in claim 28 wherein said center boss projects upward and comprises a top formed with a recess for receiving a lower end of each claw.

30. A system as claimed in claim 28 wherein said center boss comprises a plurality of upright wall segments and a plurality of space segments for receiving said claws, respectively, and said wall segments and said space segments are arranged alternately in a circle around a vertical axis of said rotatable disk seat.

31. A system as claimed in claim 30 wherein each of said space segments is open upward to receive one of the claws from above, and open radially to allow a movement of one of said claws in a radial direction.

32. A system as claimed in claim 5 wherein said curing section comprises a turntable, a bonded disk supplying subsection for receiving a bonded disk formed by bonding the first and second disks by the adhesive from said coating section and for placing the bonded disk on said turntable, and an ultraviolet irradiating subsection for irradiating ultraviolet rays to the bonded disk to cure an adhesive layer between the first and second disks of the bonded disk; wherein said curing section further comprises a confining means for preventing a deformation of the bonded disk during a ultraviolet irradiation by said ultraviolet irradiating subsection, said confining means comprises a quartz base for underlying the bonded disk, and a quartz cover for overlying the bonded disk, the quartz base comprises an upward facing underlying flat surface for underlying the bonded disk, and the quartz cover comprises a downward facing overlying flat surface for overlying the bonded disk; wherein said confining means further comprises a spacing means for spacing the underlying surface of the quartz base and the overlying surface of the quartz cover from each other; and wherein said bonded disk supplying subsection comprises a transfer mechanism for placing the bonded disk on the quartz base on said turntable, said curing section further comprises a weight putting subsection for putting the quartz cover on the bonded disk resting on said quartz base, and said ultraviolet irradiating subsection comprises an ultraviolet irradiating device for irradiating the ultraviolet rays to the bonded disk interposed between the quartz base and cover.

33. A system as claimed in claim 32 wherein said spacing means includes a means for separating said underlying and overlying surfaces and holding said underlying and overlying surfaces parallel to each other when the quartz cover is placed directly on the quartz base without interposition of the bonded disk.

34. A system as claimed in claim 33 wherein said spacing means includes a means for preventing a displacement of the quartz cover relative to the quartz cover along a direction parallel to the underlying surface; wherein each of the quartz base and cover is in a radially symmetric shape; and wherein said confining means comprises a plurality of the quartz bases mounted on said turntable, and a plurality of the quartz covers mounted on said turntable.

35. A system as claimed in claim 32 wherein said spacing means comprises a center projection formed in one of the quartz base and cover.

36. A system as claimed in claim 35 wherein a height of said center projection is smaller than a predetermined thickness of the bonded disk which is a sum of thicknesses of the first and second disks and a predetermined thickness of the adhesive layer.

37. A system as claimed in claim 35 wherein a height of said center projection is equal to or greater than a predetermined thickness of the bonded disk which is a sum of thicknesses of the first and second disks and a predetermined thickness of the adhesive layer, and equal to or small than a sum of the predetermined thickness of the bonded disk and a predetermined maximum allowable amount of deformation of the bonded disk along a thickness direction of the bonded disk.

38. A system as claimed in claim 35 wherein said spacing means further comprises a center depression for receiving the center projection, the center projection is formed in one of the quartz base and cover, and the center depression is formed in the other of the quartz base and cover.

39. A system as claimed in claim 38 wherein a height of the center projection is smaller than a sum of a depth of the center depression and a predetermined thickness of the bonded disk which is a sum of thicknesses of the first and second disks and a predetermined thickness of the adhesive layer, and the height of the center projection is greater than the depth of the center depression.

40. A system as claimed in claim 38 wherein a height of said center projection is greater than a sum of a depth of the center depression and a predetermined thickness of the bonded disk which is a sum of thicknesses of the first and second disks and a predetermined thickness of the adhesive layer, and the height of the center projection is equal to or smaller than a sum of the thickness of the bonded disk, the depth of the center depression and a maximum allowable amount of deformation of the bonded disk along the thickness direction of the bonded disk.

41. A system as claimed in claim 38 wherein said center projection is in a form of a circular cylinder for being inserted in the center hole of the bonded disk, and said center depression is circular, wherein each of said underlying and overlying surfaces of said quartz base and cover is an annular flat surface surrounding one of the center projection and depression, and the bonded disk has lower and upper parallel flat surfaces which are formed, respectively, by the second and first disks and which define the thickness of the bonded disk therebetween, and wherein each of said quartz base and cover is circular, and larger in diameter than the bonded disk.

42. A system as claimed in claim 38 wherein said spacing means further comprises an annular spacer for surrounding the bonded disk between said quartz base and cover.

43. A system as claimed in claim 42 wherein said annular spacer is integral with one of said quartz base and cover, and.

44. A system as claimed in claim 42 wherein a thickness of said annular spacer is equal to or greater than a predetermined thickness of the bonded disk, and equal to or smaller than a sum of the predetermined thickness of the bonded disk and a maximum allowable amount of deformation of the bonded disk along a thickness direction of the bonded disk.

45. A system as claimed in claim 32 wherein said spacing means comprises an annular spacer for surrounding the bonded disk between said quartz base and cover and for spacing said quartz base and cover form each other.

46. A disk fabricating process for forming a single disk by bonding first and second disks, said system comprising:

an adhesive supplying step for supplying a liquid adhesive to the first disk;

a disk handling step for arranging the first and second disks in a confronting state in which the first and second disks confront each other and the adhesive supplied to the first disk is interposed between the first and second disks, and for transferring the first and second disks so that the first and second disks remain in the confronting state; and a coating step for receiving the first and second disks after the disk handling step, and spreading the liquid adhesive between the first and second disks by a centrifugal force;

wherein said disk handling step comprises a disk holding operation for holding the first and second disks in the confronting state in which the first and second disks are spaced apart from each other and the first and second disks confront each other, and for transferring the first and second disks to said coating section while maintaining the confronting state.

47. A disk fabricating process for forming a single disk by bonding first and second disks, said system comprising:

an adhesive supplying step for supplying a liquid adhesive to the first disk;

a disk handling step for arranging the first and second disks in a confronting state in which the first and second disks confront each other and the adhesive supplied to the first disk is interposed between the first and second disks, and for transferring the first and second disks so that the first and second disks remain in the confronting state; and a coating step for receiving the first and second disks after the disk handling step, and spreading the liquid adhesive between the first and second disks by a centrifugal force, wherein said disk handling step comprises:

a second disk gripping step of gripping the second disk;

a second disk transferring step of transferring the second disk to a position just above the first disk;

a clearance adjusting step of adjusting a clearance between the fist and second disk by moving the first and second disks relative to each other along a vertical direction; and a first disk gripping step of gripping the first disk so that the first and second disk confront each other.

48. A process as claimed in claim 47 wherein said second disk gripping step comprises an operation for gripping the second disk by sucking the second disk, and said first disk gripping step comprises an operation for chucking the first disk by moving claws radially; wherein said second disk gripping step further comprises an operation for centering the second disk by moving the claws radially outward in a center hole of the second disk; and wherein the second disk has a first surface and a second surface which is to be bonded to the first disk with the adhesive, and said second disk gripping step comprises an operation for gripping the first surface of the second disk.

* * * * *